United States Patent
Minemura

(10) Patent No.: US 8,879,198 B2
(45) Date of Patent: Nov. 4, 2014

(54) LIBRARY APPARATUS WITH A TRANSPORTABLE RECORDING AND REPRODUCING UNIT

(75) Inventor: Tsukasa Minemura, Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/540,993

(22) Filed: Jul. 3, 2012

(65) Prior Publication Data

US 2013/0044390 A1 Feb. 21, 2013

(30) Foreign Application Priority Data

Aug. 18, 2011 (JP) .................................. 2011-178791

(51) Int. Cl.
*G11B 15/68* (2006.01)
(52) U.S. Cl.
CPC .................................. *G11B 15/6835* (2013.01)
USPC ........................................................ 360/92.1
(58) Field of Classification Search
CPC .... G11B 15/683; G11B 15/684; G11B 15/68; G11B 15/682; G11B 15/6835; G11B 15/6895
USPC ......... 360/91–94, 96.51, 96.61, 98.01–98.08, 360/99.06, 99.07, 99.12–99.14; 369/30.38–30.4, 30.46–30.49, 369/30.58–30.61; 720/614–616, 646, 647, 720/652–655, 657
See application file for complete search history.

(56) References Cited

U.S. PATENT DOCUMENTS

| | | | | |
|---|---|---|---|---|
| 5,337,297 | A * | 8/1994 | Kvifte et al. ................. | 360/92.1 |
| 5,739,978 | A * | 4/1998 | Ellis et al. .................... | 360/92.1 |
| 6,144,521 | A * | 11/2000 | Egan et al. .................... | 360/92.1 |
| 7,016,144 | B2 * | 3/2006 | Yamakawa et al. .......... | 360/92.1 |
| 2005/0065648 | A1 | 3/2005 | Sasaki | |

FOREIGN PATENT DOCUMENTS

| | | |
|---|---|---|
| JP | 7-141124 | 6/1995 |
| JP | 2005-93000 | 4/2005 |

\* cited by examiner

*Primary Examiner* — Nathan Danielsen

(74) *Attorney, Agent, or Firm* — Staas & Halsey LLP

(57) ABSTRACT

A library apparatus includes a medium storage unit that has a plurality of cells, the plurality of cells being storable a recording medium for each, a recoding and reproducing unit that reads data from and writes data onto the recording medium, and a transport unit that transports the recoding and reproducing unit to one of the plurality of cells in which the recoding medium subject to data access is stored and inserts the recording medium into a medium insertion and removal opening of the recoding and reproducing unit.

7 Claims, 32 Drawing Sheets

LIBRARY APPARATUS WITH A TRANSPORTABLE RECORDING AND REPRODUCING UNIT

CROSS-REFERENCE TO RELATED APPLICATION

This application is based upon and claims the benefit of priority of the prior Japanese Patent Application No. 2011-178791, filed on Aug. 18, 2011, the entire contents of which are incorporated herein by reference.

FIELD

The embodiment discussed herein is related to a library apparatus.

BACKGROUND

A library apparatus functions as an external storage apparatus with a large capacity. It generally stores, for example, thousands of cartridges, in each of which a magnetic tape is accommodated as a storage medium, in a storage unit in a locker. The storage medium in each cartridge is automatically accessed to, for example, read and write data.

In addition to the storage unit in which cartridges are stored as described above, the library apparatus includes mechanisms, such as a cartridge access station (CAS), a direct entry/exit (DEE), and a forced exit station (FES), which are used to insert cartridges from the outside into the library apparatus or eject them from the library apparatus to the outside, a plurality of magnetic tape drive units (MTUs) used to access the storage media (magnetic tapes) in the cartridges to, for example read recorded data and write data to be recorded, and an automatic cartridge transporting robot, referred to below as an accessor (ACC), which is used to automatically transport cartridges among the storage unit, the cartridge entry/exit mechanisms, and the MTUs.

When this type of library apparatus receives a request to access a certain cartridge from a high-end unit or the like, the accessor moves to the storage unit, searches for the cartridge, transports the cartridge, which is being grasped by a hand mechanism included in the accessor, to the relevant MTU, and inserts the cartridge into the MTU. Then, the MTU performs processing for the storage medium (magnetic tape) in the cartridge. Upon completion of the processing, the cartridge is ejected from the MTU and is grasped again by the hand mechanism. The cartridge is then transported to the storage unit by the accessor and is placed at the correct position.

In addition to the hand mechanism that grasps a cartridge, the accessor includes a transport unit that transports the hand mechanism from a cell, in which the cartridge is placed, in the storage unit to the insertion opening of the MTU. The hand mechanism includes a grasping mechanism that grasps a cartridge and another mechanism that inserts a cartridge into a cell or the MTU through its opening and takes out the cartridge from there through the opening. The transport unit includes mechanisms that move the hand mechanism vertically and horizontally in the library apparatus.

Japanese Laid-open Patent Publication Nos. 2005-93000 and 7-141124 are examples of related art.

With this type of conventional general magnetic tape auto loader, however, the accessor has a driving mechanism used as the grasping mechanism to open and close a member that grasps a cartridge, another driving mechanism used as the transport unit to move the hand mechanism vertically, and another driving mechanism used as the transport unit to move the hand mechanism horizontally, so the structure of the magnetic tape auto loader is complex. Accordingly, the manufacturing cost of the magnetic tape auto loader is increased and it is also difficult to reduce its size. Another problem is that many driving motors are used to achieve these driving mechanisms, increasing power consumption.

SUMMARY

According to an aspect of the embodiments, a library apparatus includes a medium storage unit that has a plurality of cells, the plurality of cells being storable a recording medium for each, a recoding and reproducing unit that reads data from and writes data onto the recording medium, and a transport unit that transports the recoding and reproducing unit to one of the plurality of cells in which the recoding medium subject to data access is stored and inserts the recording medium into a medium insertion and removal opening of the recoding and reproducing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of a library apparatus is described with reference to the drawings. The embodiment is merely an example and there is no intention to exclude applications of various variations and technologies that are not clearly described in this embodiment. That is, many variations of the embodiment are possible without departing from the intended scope of the disclosure.

Figure 1:
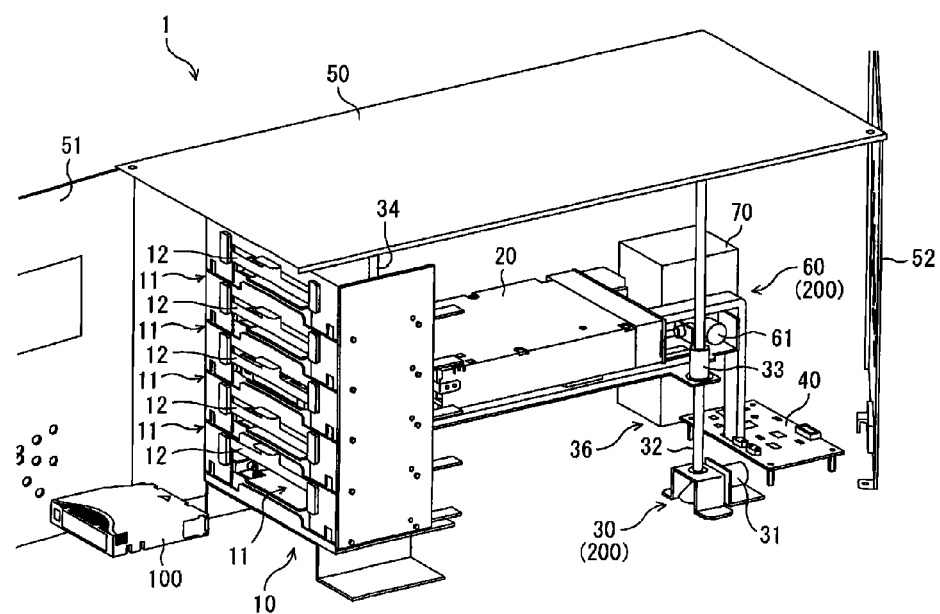
FIG. 1 schematically illustrates the structure of a library apparatus as an example of an embodiment.
Figure 2:
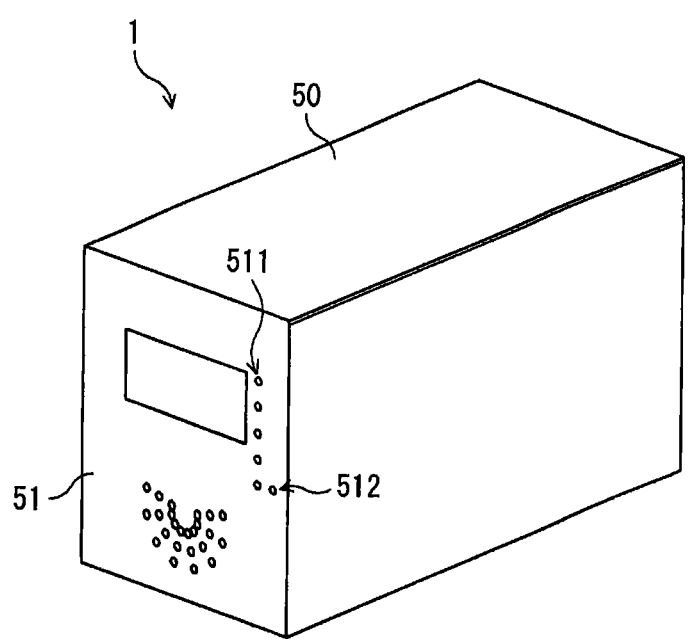
FIG. 2 is an external perspective view of the library apparatus.
Figure 3:
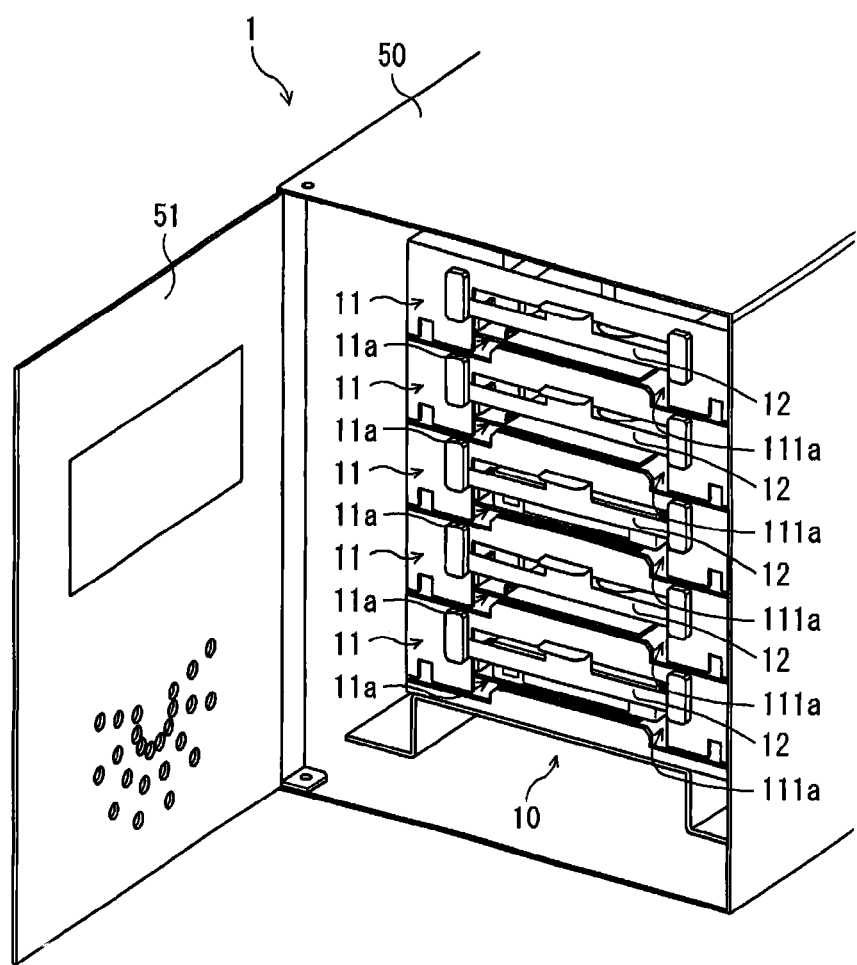
FIG. 3 is a perspective view illustrating a medium storage unit of the library apparatus.

FIG. 1 schematically illustrates the structure of the library apparatus 1 as an example of an embodiment. FIG. 2 is an external perspective view of the library apparatus 1. FIG. 3 is a perspective view illustrating a medium storage unit 10 with a front door 51 of the library apparatus 1 open.

The library apparatus 1 is installed as an external storage apparatus that backs up data stored in, for example, a computer system (not illustrated). The library apparatus 1 includes a plurality of portable recording media. A cartridge recording medium unit, which accommodates a recoding medium, is used as the portable recording medium. Examples of the portable recording media include magnetic tape cartridges, flexible disks, optical disks, and magnetic tapes wound on reels. In this embodiment, a case in which a magnetic tape cartridge using a magnetic tape as a recording medium is used as the portable recording medium is described. In the description below, the magnetic tape cartridge is also referred to below simply as the tape cartridge.

As illustrated in FIG. 1, the library apparatus 1 includes the medium storage unit 10, a drive 20, a transport unit 200, a control unit 40, and a power supply 70 in a locker 50.

The locker 50, formed as a hexahedron, has an openable front door 51 on its face (left side face in FIG. 2), and also has an openable rear door 52 on a face opposite to the front door 51.

With the library apparatus 1, the side on which the front door 51 of the locker 50 is disposed is referred to below as the front side (forward) and the side on which the rear door 52 is disposed is referred to below as the rear side (backward).

The power supply 70, control unit 40, drive 20, transport unit 200 and the like are disposed on the rear side of the locker 50. When the rear door 52 is opened, these components may be accessed for, for example, maintenance.

As illustrated in FIG. 2, an apparatus state LED 512 and a plurality of medium IN LEDs 511 (five LEDs in the example in FIG. 2) are provided on a surface of the front door 51 of the external side of the library apparatus 1.

Each medium IN LED 511 correspond to a cell 11 (described later) of the medium storage unit 10; as many medium IN LEDs 511 as the number of cells 11 are disposed. Each medium IN LED 511 is turned on when a tape cartridge 100 is stored in its corresponding cell 11.

The medium IN LED 511 is turned on when an IN sensor 161 (see FIG. 16, for example), which is described later in detail, provided in the relevant cell 11 senses the presence of the tape cartridge 100 in the cell 11. The turned-on state of the medium IN LED 511 is sent to the control unit 40 described later.

The apparatus state LED 512 indicates the state of the drive 20, Whether to turn on the apparatus state LED 512 is controlled according to, for example, the result of self test executed at the time of initialization during a process to start the drive 20.

This self test may be carried out for various general diagnosis items in power-on self test (POST) executed for a tape drive unit. For example, it is diagnosed whether, for example, the drive 20 has been correctly powered on, the drive 20 has been correctly recognized, and there are abnormal signals.

The apparatus state LED 512 is turned on in green when the self test result indicates that the drive 20 is functioning normally and is turned on in red when an error is detected. That is, for example, the result of the self test executed for the drive 20 is sent to the control unit 40 and the control unit 40 turns on the apparatus state LED 512 in red or green according to the result.

The medium storage unit 10 is disposed on the front side of the locker 50. With the front door 51 open as illustrated in FIG. 3, the operator may insert the tape cartridge 100 into and remove it from each cell 11 of the medium storage unit 10.

The medium storage unit 10 accommodates a plurality of tape cartridges 100 (also referred to below as media) as cartridge recording media that store data. The medium storage unit 10 includes a plurality of storage spaces (also referred to as cells) 11 (five storage spaces in this embodiment), in each of which one tape cartridge 100 is stored, are provided vertically. The cells 11 have the same structure.

Figure 27:
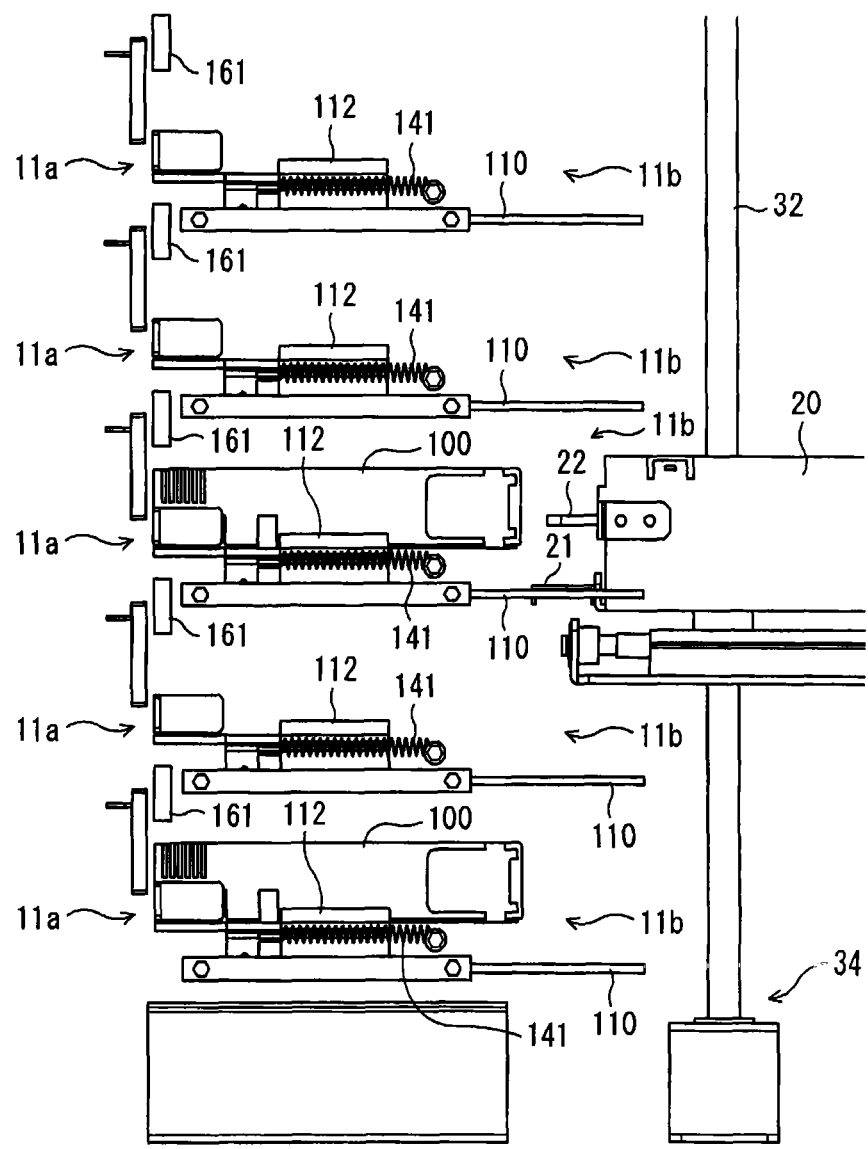
FIG. 27 is another side view representing a positional relationship among the drive and components of the medium storage unit in the library apparatus.

Each cell 11 has an opening that extends through the medium storage unit 10 from the front side to the rear side. The opening on the front side is referred to as an operator-side opening 11a and the opening on the rear side is referred to as a drive-side opening 11b (see FIG. 27, for example).

Figure 4:
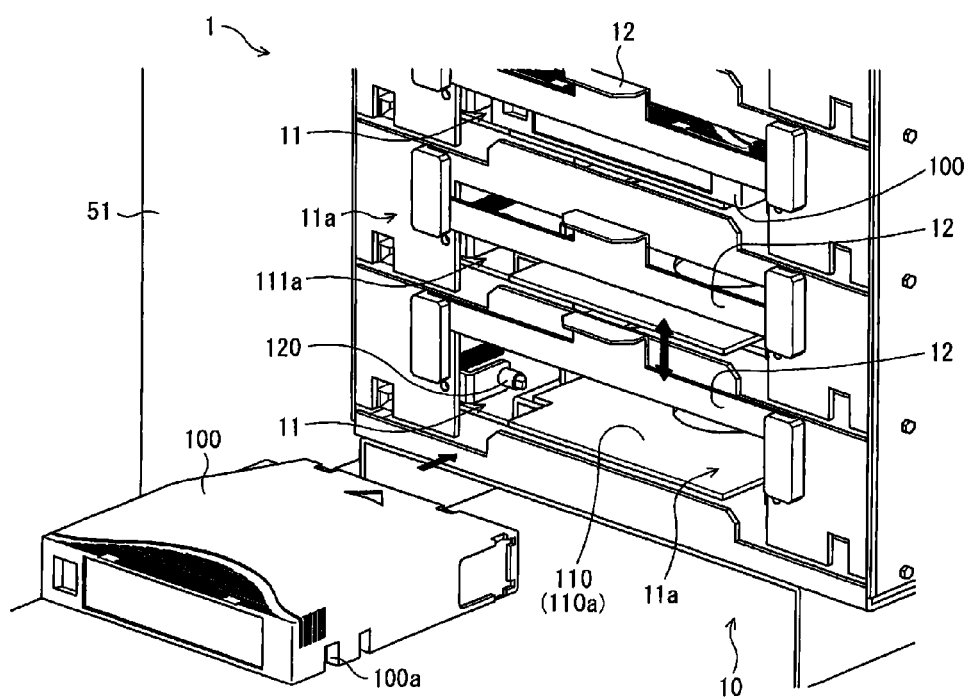
FIG. 4 is a perspective view illustrating openings on the operator side of the library apparatus.
Figure 5:
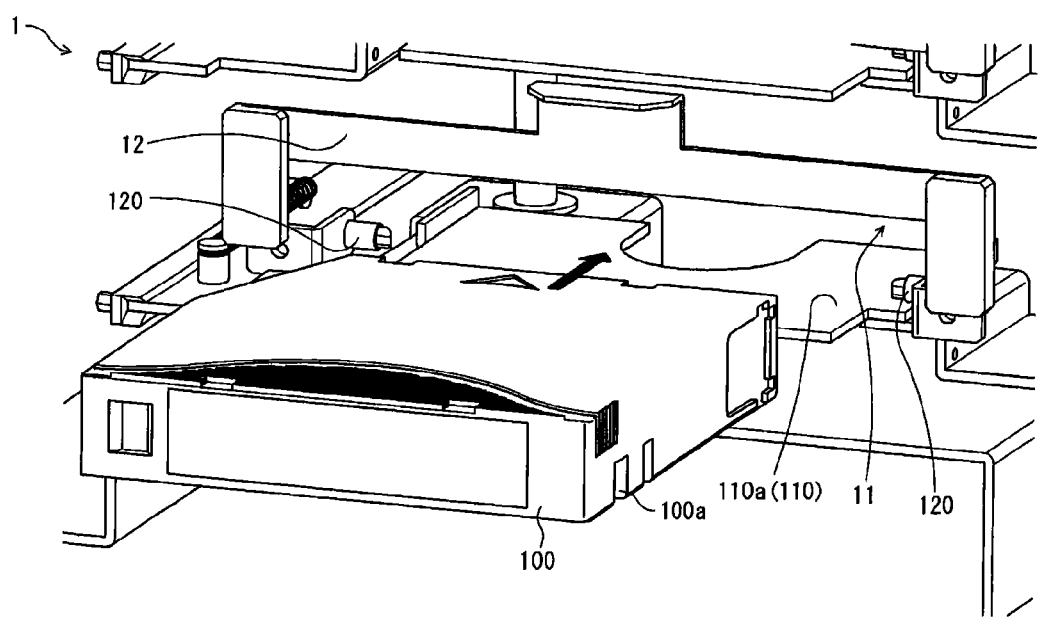
FIG. 5 is another perspective view illustrating the opening on the operator side of the library apparatus.

In each cell 11, a cell door 12 is provided at the operator-side opening 11a so as to cover the operator-side opening 11a as illustrated in FIG. 4. The cell door 12 is structured so as to be slidable vertically while its motion in a front-rear direction is restricted. When the operator slides the cell door 12 upward, the operator-side opening 11a is exposed as illustrated in FIG. 5. The operator then inserts the tape cartridge 100 into the cell 11 through the operator-side opening 11a. When the operator slides the cell door 12 downward with the tape cartridge 100 inserted into the cell 11 through the operator-side opening 11a, the cell door 12 restricts the movement of the tape cartridge 100 in the cell 11 toward the front side.

When the cell door 12 is closed, in the operator-side opening 11a, an opening 111a is formed below the cell door 12 along the width direction of the operator-side opening 11a, as illustrated in FIG. 4. A cartridge-placing plate 110 (described later) may be inserted into the cell 11 and removed from it through the opening 111a.

The IN sensor 161 (see FIG. 20) is disposed on the upper side of the operator-side opening 11a in the cell 11. The IN sensor 161 senses the presence of the tape cartridge 100 in the cell 11 and sends a sensing result to the control unit 40. An example of the IN sensor 161 is a proximity sensor.

A pair of medium locking pawls 120 are provided at opposite positions with the tape cartridge 100 interposed therebetween in the horizontal direction (in the right and left direction on the drawing sheet of FIG. 5) orthogonal to the front-rear direction in the cell 11, as illustrated in FIG. 5.

Figure 6:
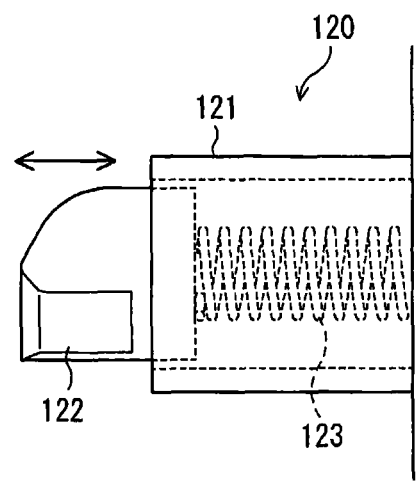
FIG. 6 is a transparent view illustrating the structure of a medium locking pawl of the library apparatus.

FIG. 6 is a transparent view illustrating the structure of the medium locking pawl 120 of the library apparatus 1, which is an example of the embodiment.

The medium locking pawl 120 has a cylindrical body 121, a head 122 slidably attached in the cylindrical body 121, and a compression spring 123, stored in the cylindrical body 121 in a compressed state, one end (left end in the example in FIG. 6) of which is in contact with the head 122. The head 122 is retained in the cylindrical body 121 by, for example, projections (not illustrated) so as not come off the cylindrical body 121.

In this structure of the medium locking pawl 120, when the head 122 projecting from the cylindrical body 121 is urged in a direction in which the compression spring 123 is compressed, the head 122 is accommodated in the cylindrical body 121 due to the elasticity of the compression spring 123; when the head 122 is released from the urged state, the head 122 protrudes from the cylindrical body 121 again.

When the tape cartridge 100 is inserted into the cell 11, the head 122 of each of the pair of medium locking pawls 120, disposed at opposite positions with the tape cartridge 100 interposed therebetween, engages one of concave parts 100a formed in the tape cartridge 100, securing the tape cartridge 100 in the cell 11. The state in which the medium locking pawls 120 engage the concave parts 100a formed in the tape cartridge 100 in the cell 11 is referred to below as the locked state of the tape cartridge 100.

Figure 7:
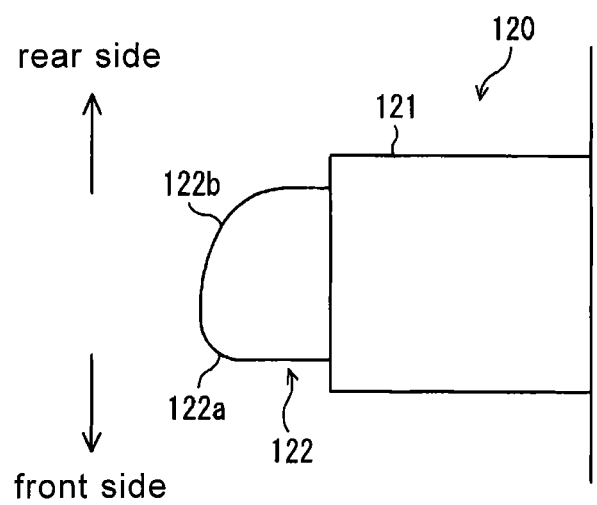
FIG. 7 is a plain view of the medium locking pawl of the library apparatus.

FIG. 7 is a plain view of the medium locking pawl 120 of the library apparatus 1, which is an example of the embodiment. As illustrated in FIG. 7, the head 122 of the medium locking pawl 120 is roundly chamfered on a surface 122a extending toward the front side and on a surface 122b extending toward the rear side. The medium locking pawl 120 is preferably worked so that the surface 122b has a larger chamfering curvature than the surface 122a.

The surface 122a of the medium locking pawl 120 comes into contact with a side surface of the tape cartridge 100 when the tape cartridge 100 is inserted into the cell 11. The surface 122b of the medium locking pawl 120 is a surface with which an unlocking pawl 22 (see FIG. 8) of the drive 20 comes into contact as described later when the tape cartridge 100 is inserted into the drive 20.

Figure 8:
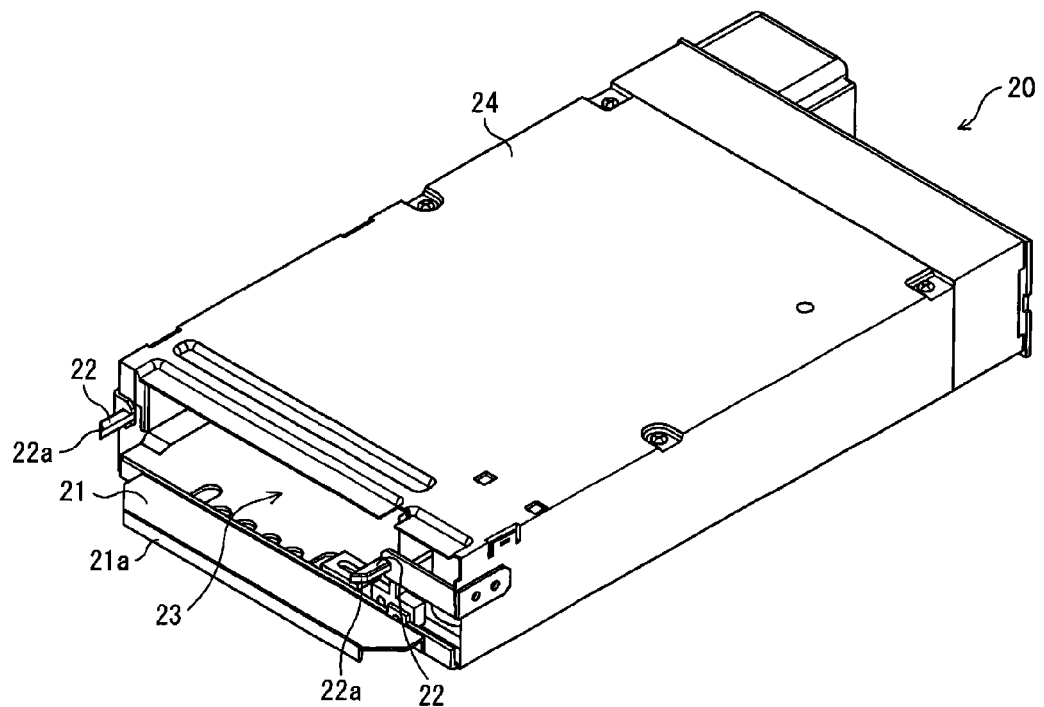
FIG. 8 is a perspective view of a drive of the library apparatus.
Figure 9A:
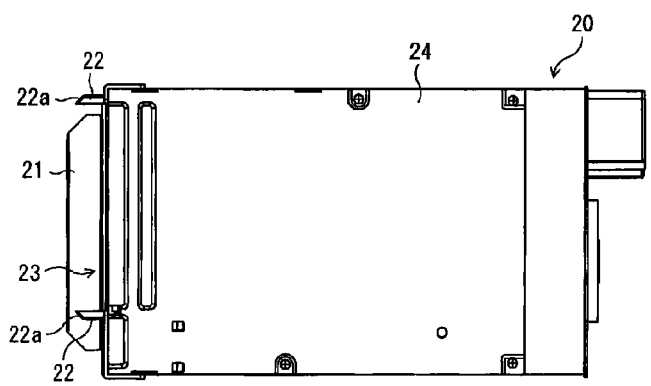
FIG. 9A is a plain view of the library apparatus.
Figure 9B:
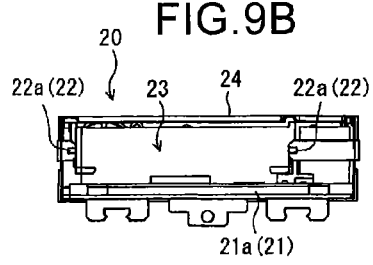
FIG. 9B is a front view of the library apparatus.
Figure 9C:
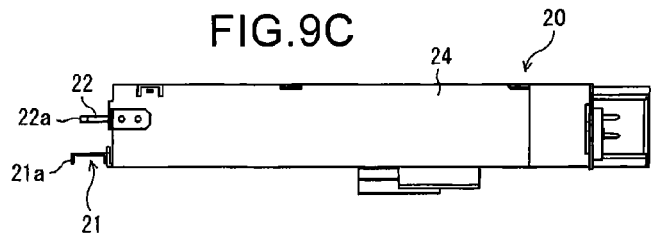
FIG. 9C is a side view of the library apparatus.

FIG. 8 is a perspective view of the drive 20 of the library apparatus 1, which is an example of the embodiment. FIGS. 9A, 9B, and 9C are a plain view, a front view, and a side view of the library apparatus 1.

The drive 20 is a recoding and reproducing unit that reads data from and writes data into the tape cartridge 100. The drive 20 includes a magnetic head, an intra-drive transport unit, a tape loading mechanism, and the like (which are not illustrated) in a drive locker 24.

The tape cartridge 100 is inserted from a medium insertion and removal opening 23 into the drive 20, and is transported to a prescribed position (loading position) in the drive locker 24 by the intra-drive transport unit (this transport is referred to positioning transport). The intra-drive transport unit includes, for example, a driving motor and rubber rollers.

When a sensor (not illustrated) provided at a prescribed position in the drive 20 detects that the tape cartridge 100 has been inserted into the drive 20, a data access process is started for the tape cartridge 100 in the drive 20. Specifically, the positioning transport by the intra-drive mechanism is started in the drive 20, after which the magnetic tape is drawn at the loading position and is transported by the tape loading mechanism along a transport path in the drive 20 (this transport is referred to as tape loading), and the magnetic head carries out data reading and writing and other processing.

Upon completion of the processing by the magnetic head carried out for the magnetic tape, the tape loading mechanism rewinds the magnetic tape into the tape cartridge 100 and carries out other processing. The intra-drive transport unit ejects the tape cartridge 100 to the outside of the drive 20 and carries out other processing.

The structures and functions of the intra-drive transport unit, tape loading mechanism, magnetic head, and other components of the drive 20 and the process to access the data in the tape cartridge 100 are achieved by the functions of a known tape drive unit, so their detail descriptions is omitted.

With the library apparatus 1, the drive 20 further includes a pressing plate 21, which protrudes along the lower edge of the medium insertion and removal opening 23 toward the front side, and a pair of unlocking pawls 22, which protrude from the edges at both ends of the medium insertion and removal opening 23 toward the front side, as illustrated in FIG. 8.

The pressing plate (pressing part) 21 is a plate-like member that protrudes from the lower edge of the medium insertion and removal opening 23 of the drive 20 toward the front side so as to be flush with a tape-placing surface 23a in the medium insertion and removal opening 23, and follows the lower edge of the medium insertion and removal opening 23, as illustrated in FIGS. 8 and 9A to 9C. An end of the pressing plate 21, opposite to an end secured to the drive 20, is bent vertically, forming an abutting surface 21a.

When the drive 20 is transported into the cell 11, in which the tape cartridge 100 has been stored by a front-rear driving mechanism 60 (see FIG. 12) of the transport unit 200 (described later), the pressing plate 21 comes into contact with the cartridge-placing plate 110 (described later) in the cell 11 and extrudes the cartridge-placing plate 110 toward the front side.

The unlocking pawl (unlocking unit) 22 is a rod-like member that extrudes from the edge at an end of the medium insertion and removal opening 23 toward the front side, the unlocking pawls 22 being disposed at opposite positions on the two edges of the medium insertion and removal opening 23, as illustrated in FIGS. 8 and 9A to 9C. The spacing between the pair of unlocking pawls 22 is slightly larger the size of the tape cartridge 100 in its width direction, so they do not interfere with the tape cartridge 100. Each unlocking pawl 22 has a slanted surface 22a, at the end (top) opposite to the end secured to the drive 20, which slants from the top of a side facing the other unlocking pawl 22 (the side may be referred to below as the inner side) toward the opposite side (the side may be referred to below as the outer side). That is, the top of the unlocking pawl 22 is formed in a wedge shape due to the slanted surface 22a.

Figure 10:
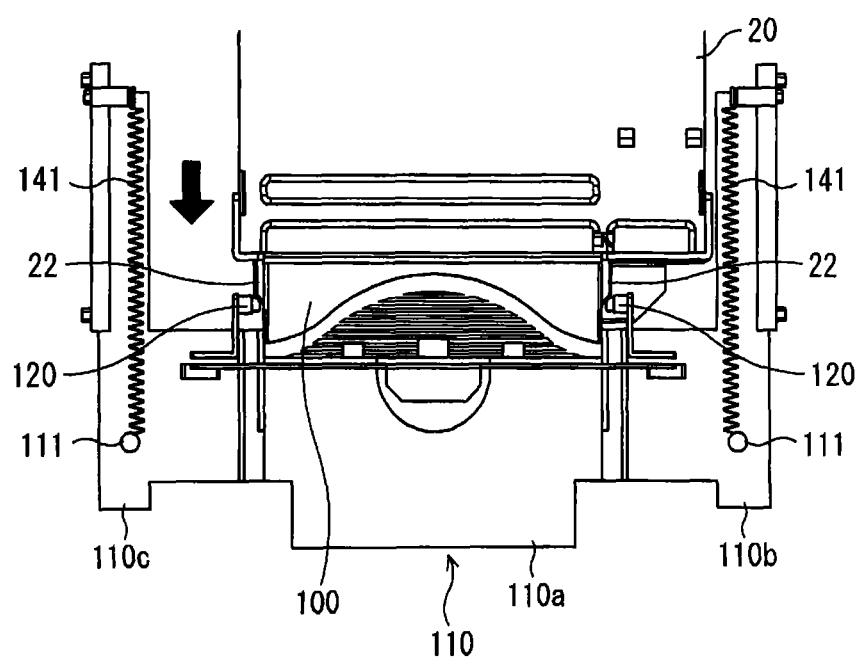
FIG. 10 is a plain view illustrating a state in which a tape cartridge is unlocked by the unlocking pawls of the library apparatus.

FIG. 10 is a plain view illustrating a state in which the tape cartridge 100 is unlocked by the unlocking pawls 22 of the library apparatus 1, which is an example of the embodiment.

When the front-rear driving mechanism 60 of the transport unit 200 described later moves the drive 20 toward the front side, the unlocking pawl 22 is inserted between the medium locking pawl 120 and the tape cartridge 100 as illustrated in FIG. 10, unlocking the tape cartridge 100.

That is, when the drive 20 is transported into the cell 11 in which the tape cartridge 100 has been stored, the unlocking pawl 22 is inserted between the medium locking pawl 120 described above and the tape cartridge 100 by the front-rear driving mechanism 60 of the transport unit 200 described later. The slanted surface 22a of the unlocking pawl 22 inserted between the medium locking pawl 120 and the tape cartridge 100 is pressed against the surface 122b of the medium locking pawl 120 and acts so as to push the head 122 into the cylindrical body 121, unlocking the tape cartridge 100, as illustrated in FIG. 10.

Figure 11:
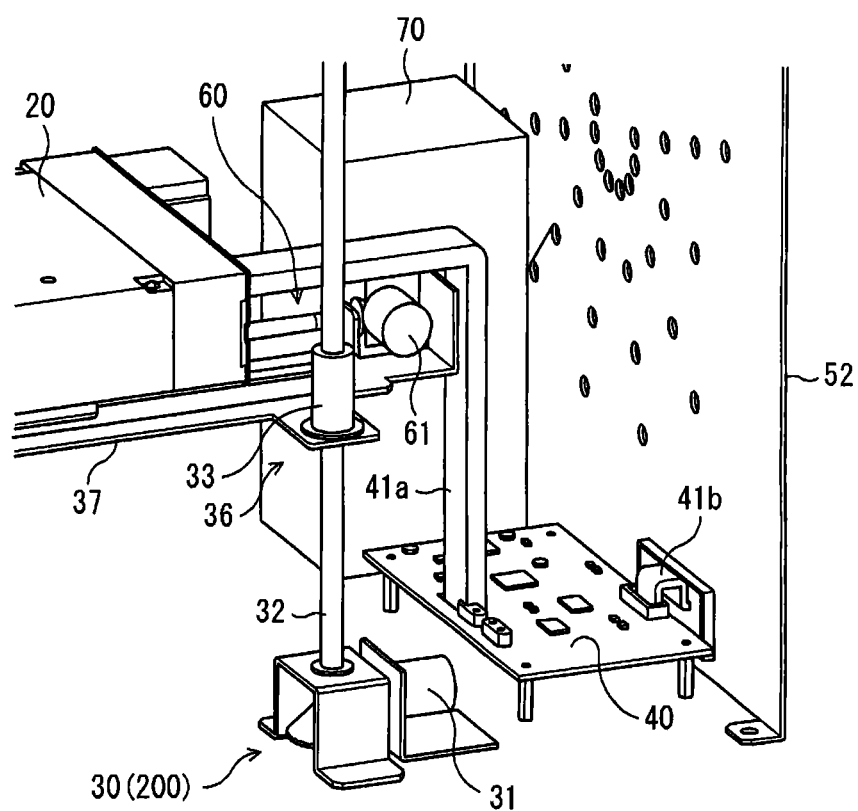
FIG. 11 is a perspective view illustrating the structure of a transport unit of the library apparatus.
Figure 12:
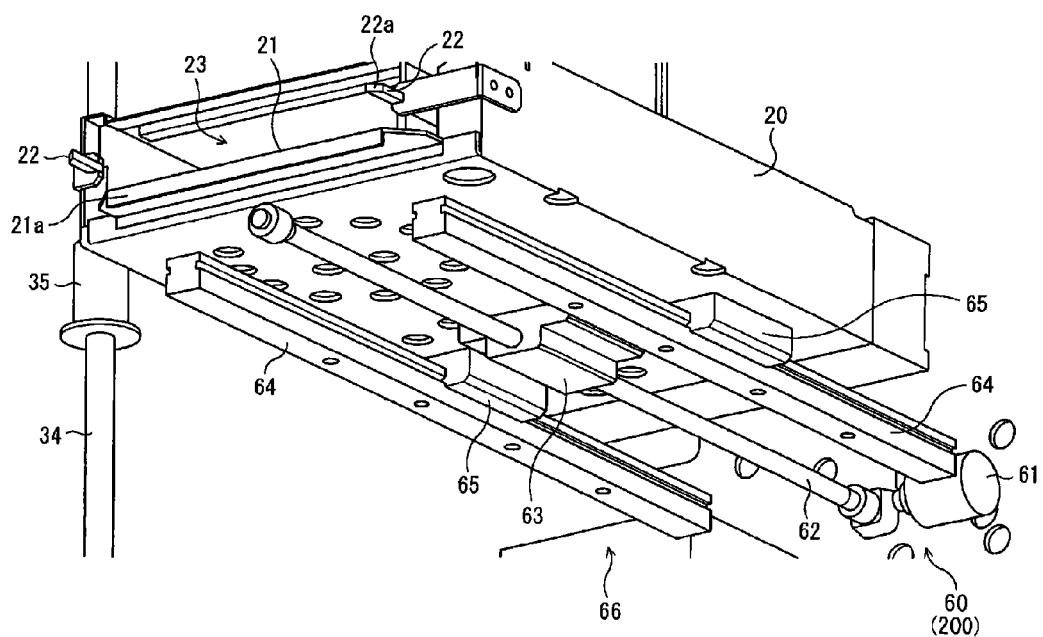
FIG. 12 is another perspective view illustrating the structure of the transport unit of the library apparatus.

FIGS. 11 and 12 are perspective views illustrating the structure of the transport unit 200 of the library apparatus 1, which is an example of the embodiment. FIG. 11 illustrates a vertical driving mechanism 30 of the transport unit 200, and FIG. 12 illustrates a front-rear driving mechanism 60 of the transport unit 200.

In this embodiment, the transport unit 200, which transports the drive 20, includes the vertical driving mechanism 30 and front-rear driving mechanism 60. The vertical driving mechanism 30 and front-rear driving mechanism 60 are controlled by the control unit 40.

The vertical driving mechanism 30 moves the drive 20 vertically in the locker 50. The vertical driving mechanism 30, which is formed with, for example, an electric screw cylinder mechanism, includes a ball screw 36 and a vertical driving motor 31.

The ball screw 36 includes a screw axis 32 and a nut 33. The screw axis 32 is erected upward in the locker 50 from its bottom and is threaded around the circumference. For simplicity, the threads of the screw axis 32 are not illustrated in FIGS. 1 and 11. The nut 33 is externally fitted to the screw axis 32 with steel balls (not illustrated) interposed therebetween. The nut 33 moves vertically according to the rotation of the screw axis 32. The ball screw 36 is formed with a known method, so its detailed description is omitted. A bed 37, on which the drive 20 is placed, is secured to the nut 33.

The vertical driving motor 31, which is, for example, a stepper motor, rotationally drives the screw axis 32 along its rotational axis. The nut 33 moves vertically according to the rotational driving of the screw axis 32 and the drive 20 then moves vertically in the locker 50 accordingly.

A shaft 34 is provided at a position on a diagonal line extending from the position at which the bed 37 is fixed to the nut 33 in parallel to the screw axis 32 (see FIG. 12). A holder 35 is slidably fitted to the shaft 34 through a linear bearing or the like. The holder 35 is secured to the bed 37 on which the drive 20 is placed. The holder 35 moves vertically along the shaft 34 according to the vertical movement of the drive 20 by the vertical driving mechanism 30. That is, the shaft 34 and holder 35 support the drive 20 in cooperation with the vertical driving mechanism 30 so that the drive 20 may be moved vertically and parallel to the shaft 34 in a stable state.

The rotational operation of the vertical driving motor 31 is controlled by the control unit 40, which is described later.

The front-rear driving mechanism 60 moves the drive 20 in the locker 50 toward the front side and rear side. As with the vertical driving mechanism 30, the front-rear driving mechanism 60 is formed with, for example, an electric screw cylinder mechanism; the front-rear driving mechanism 60 includes a ball screw 66 and a front-rear driving motor 61.

The ball screw 66 includes a screw axis 62 and a nut 63 as illustrated in FIG. 12. For simplicity, the bed 37, vertical driving mechanism 30, and the like are not illustrated in FIG. 12. The screw axis 62 is disposed horizontally in the locker 50 in the front-rear direction and is threaded around the circumference. For simplicity, the threads of the screw axis 62 are not illustrated in FIG. 12.

The nut 63 is externally fitted to the screw axis 62 with steel balls (not illustrated) interposed therebetween. The nut 63 moves in the front-rear direction according to the rotation of the screw axis 62. The ball screw 66 is also formed with a known method, so its detailed description is omitted. The nut 63 is secured to the bottom of the drive 20.

Transport rails 64 are provided on both sides of the screw axis 62 in parallel to the screw axis 62. A guide member 65 is slidably attached to each transport rail 64 in the longitudinal direction of the transport rail 64. As with the nut 63, the guide member 65 is fixed to the bottom of the drive 20. The bottom surface of the transport rail 64 is secured to the bed 37.

The front-rear driving motor 61, which is, for example, a stepper motor, rotationally drives the screw axis 62 along its rotational axis. The nut 63 moves in the front-rear direction along the transport rails 64 according to the rotational driving of the screw axis 62 and the drive 20 then moves in the front-rear direction in the locker 50 accordingly.

The rotational operation of the front-rear driving motor 61 is controlled by the control unit 40, which is described later.

That is, the transport unit 200 structured as described above enables the drive 20 to freely move vertically and in the front-rear direction in the locker 50.

In the cell 11, the tape cartridge 100 is placed on the cartridge-placing plate 110.

Figure 13:
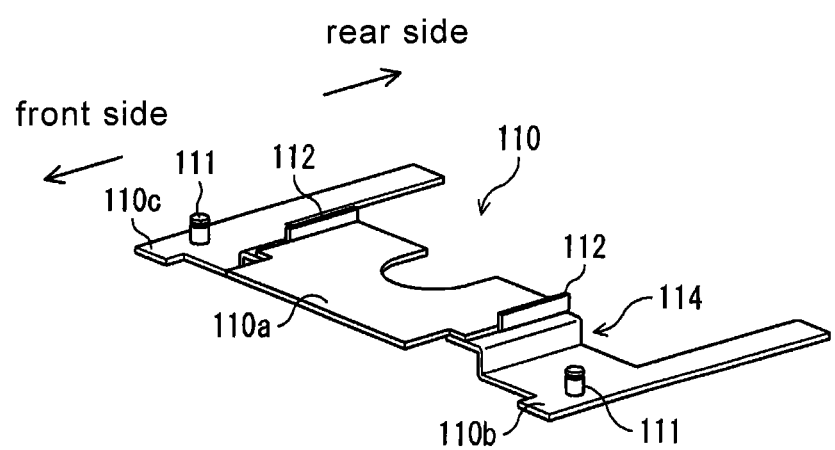
FIG. 13 is a perspective view illustrating the structure of a cartridge-placing plate of the library apparatus.
Figure 14A:
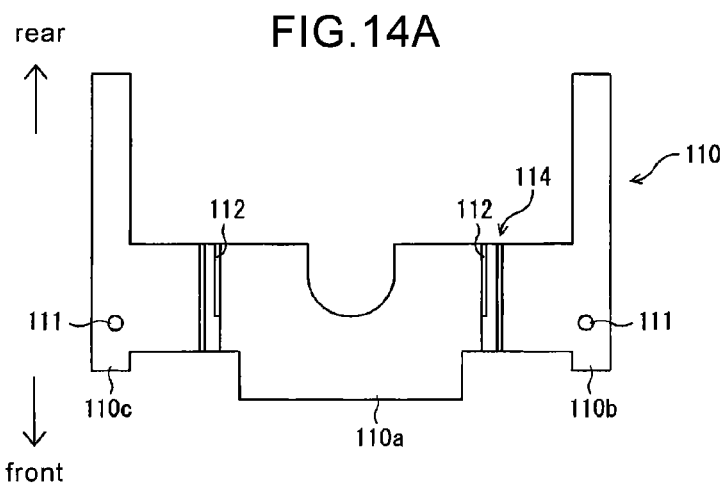
FIG. 14A is a plain view of the cartridge-placing plate of the library apparatus.
Figure 14B:
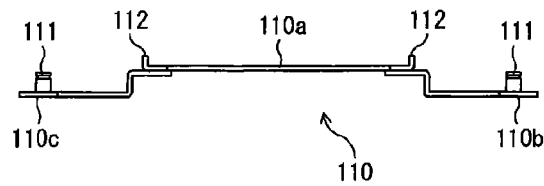
FIG. 14B is a front view of the cartridge-placing plate of the library apparatus.
Figure 14C:
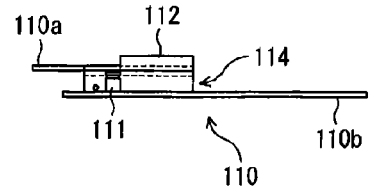
FIG. 14C is a side view of the cartridge-placing plate of the library apparatus.

FIG. 13 is a perspective view illustrating the structure of the cartridge-placing plate 110 of the library apparatus 1, which is an example of the embodiment. FIGS. 14A, 14B, and 14C are a plain view, a front view, and a side view of the cartridge-placing plate 110 of the library apparatus 1, respectively.

The cartridge-placing plate 110 includes a placing part 110a and pulling parts 110b and 110c as illustrated in FIGS. 13 and 14B.

The tape cartridge 100 is placed on the placing part 110a. The tape cartridge 100 slides in the front-rear direction (toward the top and bottom of the drawing sheet of FIG. 14A) on the placing part 110a.

Each shorter end of the placing part 110a in the width direction (in the right and left direction on the drawing sheet of FIG. 14A) is bent upward in the vertical direction, forming a guide 112. The tape cartridge 100 is placed on the placing part 110a between the guides 112. The guides 112 guide the tape cartridge 100 in the front-rear direction while suppressing the movement of the tape cartridge 100 placed on the placing part 110a in the width direction. The top surface of the placing part 110a preferably has no projections or the like so that the sliding of the tape cartridge 100 is not impeded and is preferably smooth so that its coefficient of friction becomes low.

Part of the rear-side surface of the placing part 110a is cut in an arc shape to reduce the weight of the placing part 110a. The shape of the cutout of the placing part 110a, which is formed to reduce its weight, is not limited to the arch shape; for example, a plurality of holes may be formed and other various variations may be made.

The pulling part 110b is secured to one end of the placing part 110a in the width direction and the pulling part pulling part 110c is secured to the other end. The pulling parts 110b and 110c each have a spring attaching part 111 to which one end of a coil spring 141 (see FIGS. 10 and 15, for example) is attached. The spring attaching part 111 is formed in a cylindrical shape protruding upward from the surface of the pulling part 110b or 110c, the one end of the coil spring 141 being attached to the vicinity of the vertex of the spring attaching part 111. The pulling parts 110b and 110c are each stepped in the direction in which the guide 112 of the placing part 110a extends (in the front-rear direction) so that the stepped part is lowered by an amount almost equal to the amount of protrusion of the spring attaching part 111.

When the drive 20 is transported into the cell 11, in which the tape cartridge 100 has been stored, by the front-rear driving mechanism 60 of the transport unit 200, the pressing plate 21 of the drive 20 comes into contact with an edge 114, which is a backward edge of vertical surfaces constituting the step formed on the pulling part 110b.

The cartridge-placing plate 110 is formed by securing the placing part 110a, pulling part 110b, and pulling part 110c, described above, together by welding, screwing, or another method.

The cartridge-placing plate 110 is placed so as to be slidable in the front-rear direction in the cell 11 along a guide member (not illustrated) or the like.

Figure 15:
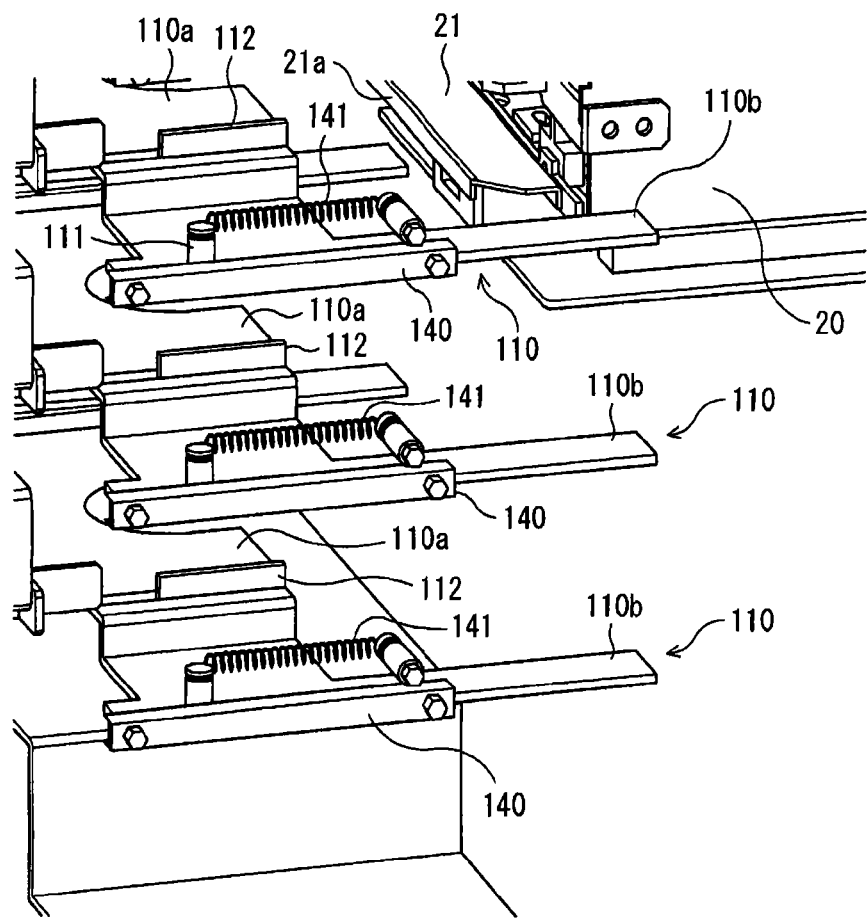
FIG. 15 is a perspective view representing a positional relationship among the drive and components of the medium storage unit in the library apparatus.
Figure 16:
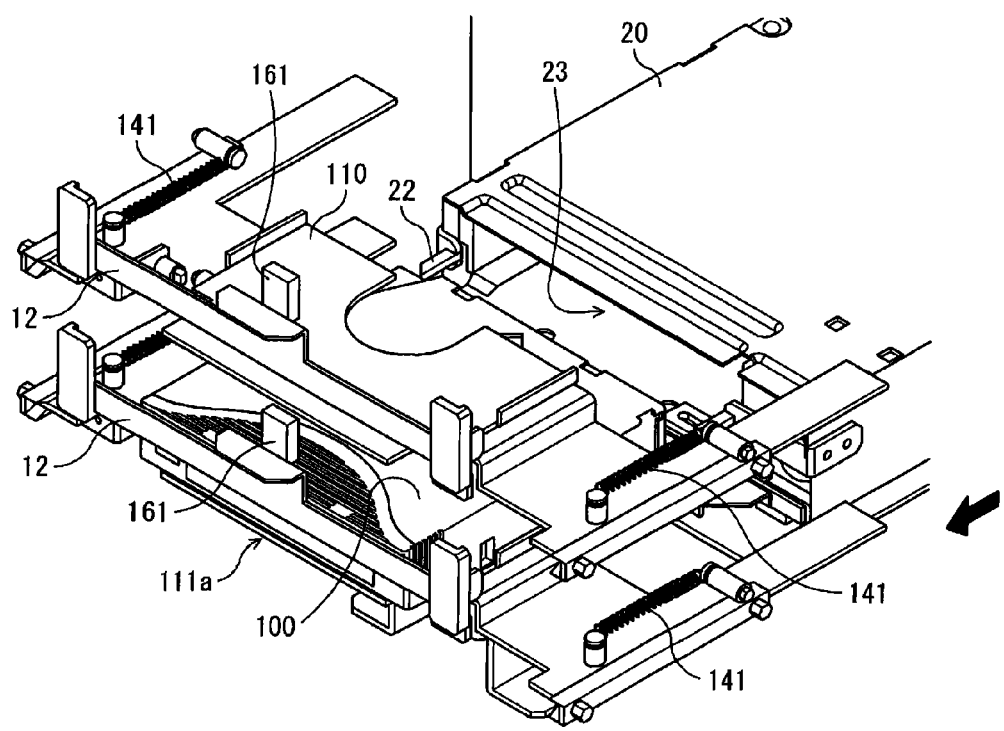
FIG. 16 is another perspective view representing a positional relationship among the drive and components of the medium storage unit in the library apparatus.
Figure 17:
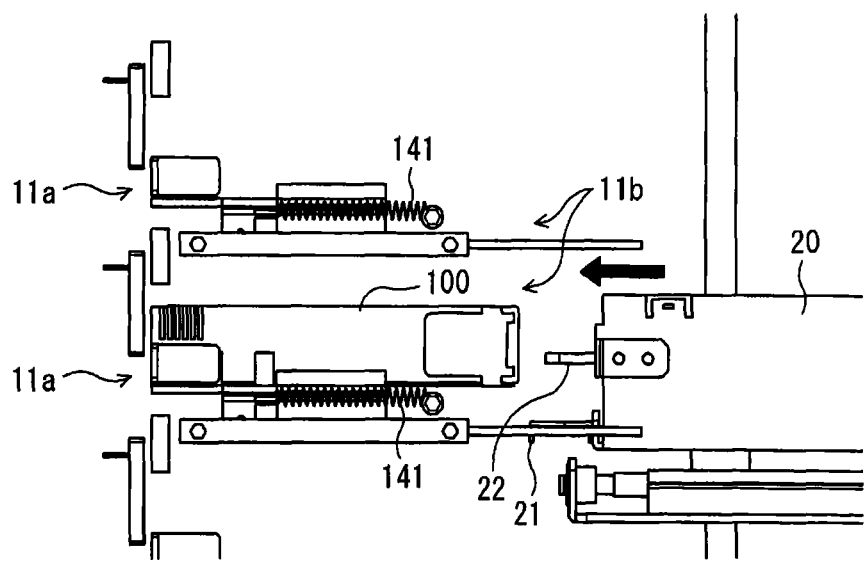
FIG. 17 is another perspective view representing a positional relationship among the drive and components of the medium storage unit in the library apparatus.
Figure 18:
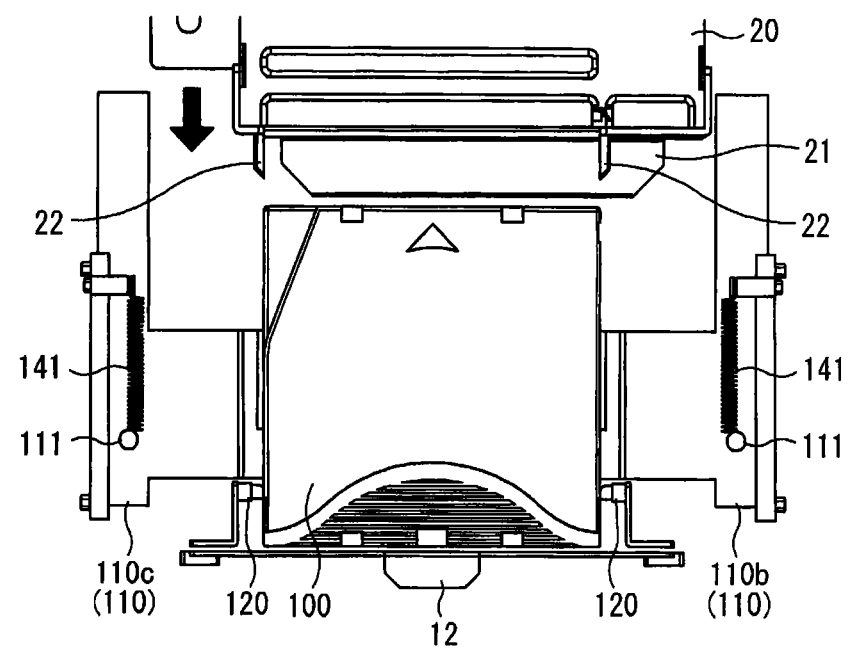
FIG. 18 is another perspective view representing a positional relationship among the drive and components of the medium storage unit in the library apparatus.

FIGS. 15 to 18 each exemplify a positional relationship among the drive 20 and components of the medium storage unit 10 in the library apparatus 1, which is an example of the embodiment. FIGS. 15 and 16 are perspective views illustrated at different angles, FIG. 17 is their side view, and FIG. 18 is a top view.

The examples in FIGS. 15 to 18 illustrate a state in the middle of the transportation of the drive 20 toward the cell 11, in which the tape cartridge 100 has been stored, by the front-rear driving mechanism 60 of the transport unit 200 described above.

For simplicity, the locker 50 and some of components constituting the medium storage unit 10 and the like are not illustrated in the examples in FIGS. 15 to 18. In FIG. 15, the tape cartridge 100 is also not illustrated.

As described above, the cartridge-placing plate 110 is placed so as to be slidable in the front-rear direction in the cell 11 along a guide member (not illustrated) or the like. Movement of the cartridge-placing plate 110 from a prescribed position toward the rear side is restricted by a stopper (not illustrated) or the like in the cell 11. FIGS. 15 to 18 indicate a state in which the cartridge-placing plate 110 is at the rearmost position. The rearmost position of the cartridge-placing plate 110 in the cell 11, illustrated in FIGS. 15 to 18, is referred to as the home position of the cartridge-placing plate 110.

Figure 20:
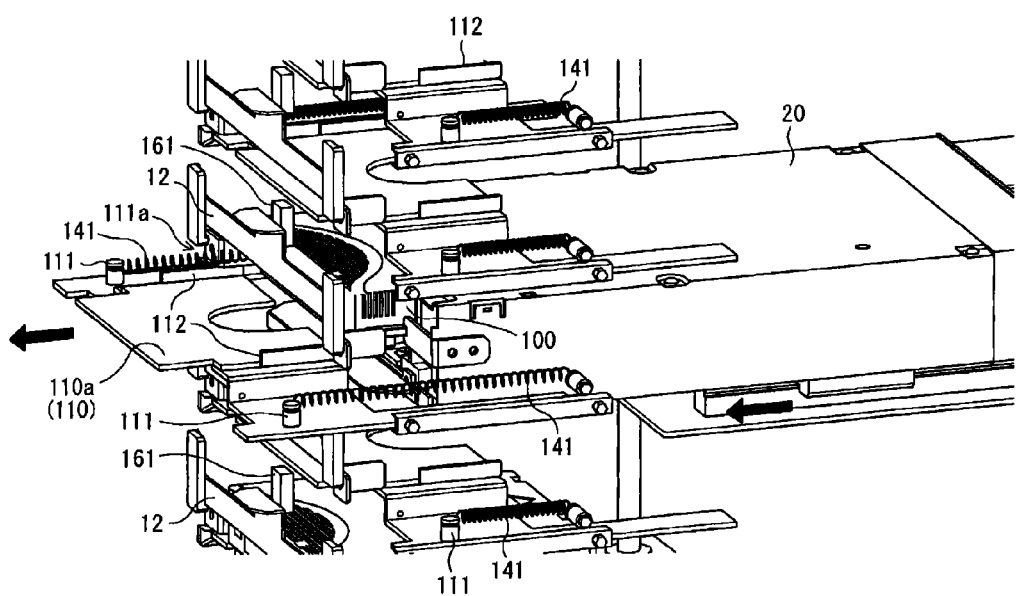
FIG. 20 is a perspective view illustrating a state of the cartridge-placing plate of the library apparatus.

However, the cartridge-placing plate 110 may move toward the front side in the cell 11 to a position at which the cartridge-placing plate 110 protrudes from the opening 111a below the cell door 12, as illustrated in FIG. 20. An amount by which the cartridge-placing plate 110 protrudes forward of the cell 11 is, for example, equal to the size of the tape cartridge 100 in the front-rear direction or less.

The other end of the coil spring 141, one end of which has been attached to the spring attaching part 111 of the cartridge-placing plate 110, is secured to a frame (not illustrated) of the medium storage unit 10. Accordingly, the coil springs 141 cause the cartridge-placing plate 110 to slide in the cell 11 in a state in which the cartridge-placing plate 110 is urged so that it is stabled at the home position. Specifically, the cartridge-placing plate 110 is moved forward by an external force in the cell 11 from the home position illustrated in FIGS. 15 to 18 while being pulled by the coil springs 141. When the external force, with which the cartridge-placing plate 110 is being moved forward, is removed, the cartridge-placing plate 110 is pulled by the coil springs 141 and returns to the home position.

Figure 19:
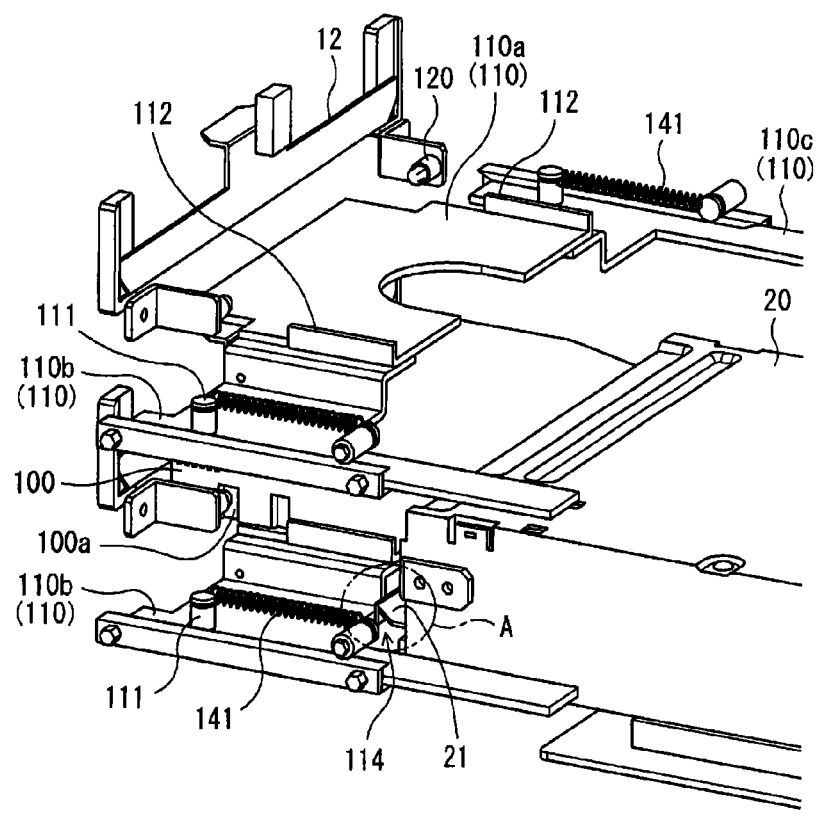
FIG. 19 is a perspective view representing a positional relationship among the drive and the cartridge-placing plate in the library apparatus.

FIG. 19 is a perspective view representing a positional relationship among the drive 20 and the cartridge-placing plate 110 in the library apparatus 1, which is an example of the embodiment.

As illustrated in FIG. 19, when the drive 20 is transported into the cell 11, the pressing plate 21 extruding forward from the drive 20 comes into contact with the edge 114, which is the backward edge of the vertical surfaces constituting the step formed on the pulling part 110b of the cartridge-placing plate 110 (see the arrow A in FIG. 19).

FIG. 20 is a perspective view illustrating a state of the cartridge-placing plate 110 of the library apparatus 1, which is an example of the embodiment. Specifically, FIG. 20 illustrates a state in which the drive 20 has been transported into the cell 11 and the cartridge-placing plate 110 is extruded from the cell 11.

When the front-rear driving mechanism 60 further transports the drive 20 in the cell 11 from the state in FIG. 19, the pressing plate 21 of the drive 20 moves toward the front side while the pressing plate 21 of the drive 20 pushes (shoves) the cartridge-placing plate 110 toward the front side.

The forward movement of the tape cartridge 100 placed on the cartridge-placing plate 110 is stopped when the medium locking pawls 120 engage the concave parts 100a (a locked state is entered) or the front-side end of the tape cartridge 100 comes into contact with the cell door 12.

When the front-rear driving mechanism 60 further moves the drive 20 toward the front side in this state, a slip is caused between the tape cartridge 100 and the upper surface of the cartridge-placing plate 110 and only the cartridge-placing plate 110 is pushed toward the front side together with the drive 20. As a result, as illustrated in FIG. 20, the pressing plate 21 of the drive 20 causes the cartridge-placing plate 110 to be extruded outwardly of the opening 111a formed below the cell door 12 in front of the cell 11.

The tape cartridge 100, the forward movement of which has been stopped by the cell door 12 or the like, enters the medium insertion and removal opening 23 of the drive 20 due to the forward movement of the drive 20.

When the tape cartridge 100 has been inserted to a prescribed position in the medium insertion and removal opening 23 of the drive 20, the tape cartridge 100 is transported to the loading position in the drive 20 by the intra-drive transport unit of the drive 20.

The position of the drive 20 in the cell 11 from which the intra-drive transport unit starts to positioning transport for the tape cartridge 100 inserted into the drive 20 is referred to below as the medium loading point.

At the medium loading point, the tape cartridge 100 inserted into the medium insertion and removal opening 23 of the drive 20 is sensed by a sensor provided in the drive 20, starting positioning transport and tape loading in the drive 20.

In the drive 20, the magnetic tape is drawn at the loading position and transported (loaded) along the transport path in the drive 20, and data is read and written by the magnetic head.

That is, the cartridge-placing plate 110 could be said to transfer the tape cartridge 100 from the cell 11 to the drive 20 and could also be said to function as an aid in the stable insertion of the tape cartridge 100 into the drive 20 by keeping the orientation of the tape cartridge 100 horizontal until the drive 20 reaches the medium loading point.

After the magnetic head has completed processing for the magnetic tape, the magnetic tape is rewound into the tape cartridge 100 and the tape cartridge 100 is ejected (unloaded) outwardly of the drive 20.

The front-rear driving mechanism 60 stores the tape cartridge 100 ejected from the drive 20 into a cell 11. The cell 11 into which to store the tape cartridge 100 may be the cell 11 in which the tape cartridge 100 has been stored or may be another cell 11 in which there is no tape cartridge 100.

When the tape cartridge 100 is stored in the cell 11, the tape cartridge 100 ejected from the drive 20 is placed in a state in which the tape cartridge 100 is projected from the medium insertion and removal opening 23 of the drive 20.

The front-rear driving mechanism 60 transports the drive 20 in a state in which the processed tape cartridge 100 is in the medium insertion and removal opening 23 to the cell 11 in which to store the tape cartridge 100.

The front-rear driving mechanism 60 inserts the drive 20 into the cell 11 until the medium locking pawls 120 engage the concave parts 100a in the tape cartridge 100 to lock the tape cartridge 100, securing the tape cartridge 100 in the cell 11.

During this insertion, the vertical driving mechanism 30 lifts the entire drive 20 to a prescribed height (about 5 mm, for example) while the drive 20 is moved by the front-rear driving mechanism 60 toward the front side, so that the unlocking pawl 22 is not interposed between the medium locking pawl 120 and the concave part 100a in the tape cartridge 100, which would otherwise impede the tape cartridge 100 from being locked.

The front-rear driving mechanism 60 then moves the drive 20 toward the rear side, and only the drive 20 is taken out with the tape cartridge 100 secured in the cell 11.

Figure 21:
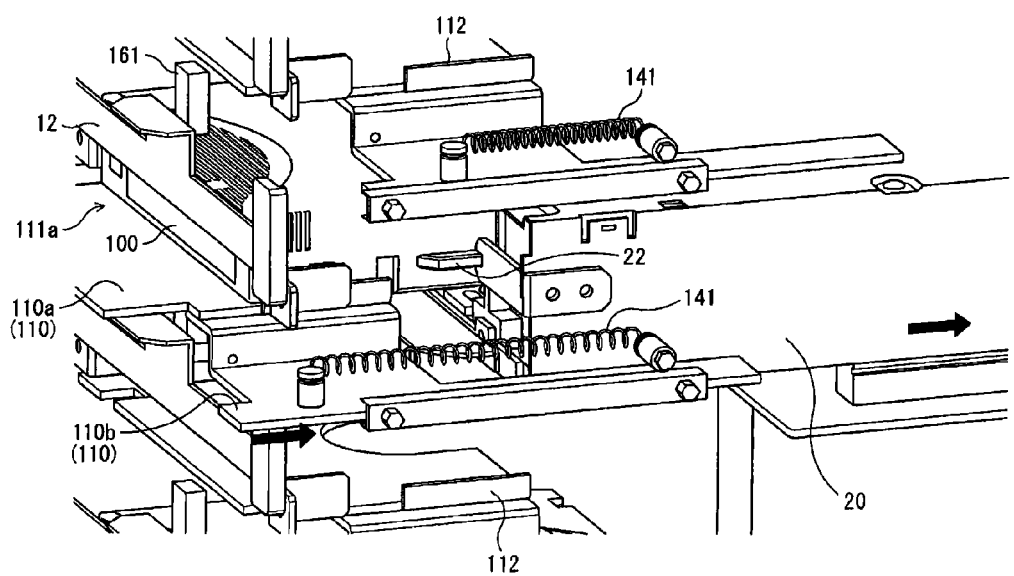
FIG. 21 is a perspective view illustrating a state in which the tape cartridge is stored in a cell in the library apparatus.

FIG. 21 is a perspective view illustrating a state in which the tape cartridge 100 is stored into the cell 11 in the library apparatus 1, which is an example of the embodiment. For simplicity, the locker 50 and some of components constituting the medium storage unit 10 and the like are not illustrated in the examples in FIG. 21 as well.

When the front-rear driving mechanism 60 moves the drive 20 toward the rear side, the cartridge-placing plate 110, which has been pressed toward the front side by the pressing plate 21 of the drive 20, is pulled toward the rear side by the contraction force of the coil springs 141, as illustrated in FIG. 21. The pulling by the coil springs 141 causes the cartridge-placing plate 110 to be placed at the home position in the cell 11.

The control unit 40 controls the vertical driving mechanism 30 and front-rear driving mechanism 60 of the transport unit 200 so that the transportation of the drive 20 is controlled. The control unit 40 is connected to the vertical driving motor 31 and front-rear driving motor 61 with control and communication cables 41a in such a way that communication is possible.

The control unit 40 has a function of controlling the rotation of the vertical driving motor 31 to control the vertical movement of the drive 20 by the vertical driving mechanism 30. The control unit 40 is structured as, for example, a circuit board on which various processing units and circuit units are mounted. The control unit 40 also controls the rotation of the front-rear driving motor 61 to control the front-rear movement of the drive 20 by the front-rear driving mechanism 60. Furthermore, the control unit 40 controls the lighting of the apparatus state LED 512 disposed on the front door 51. The control unit 40 may control the lighting of the medium IN LEDs 511 according to the sensing results of the IN sensors 161.

The control unit 40 is connected to a high-end unit (not illustrated), such as a host computer, with a control and communication cable 41b in such a way that communication is possible. When the control unit 40 receives a read request or write request for a tape cartridge 100 stored in the library apparatus 1 from the high-end unit, the control unit 40 moves the drive 20 to the cell 11 in which the tape cartridge 100 is stored and starts processing to insert the tape cartridge 100 into the drive 20.

The power supply 70 supplies electric power to the components of the library apparatus 1.

Figure 22:
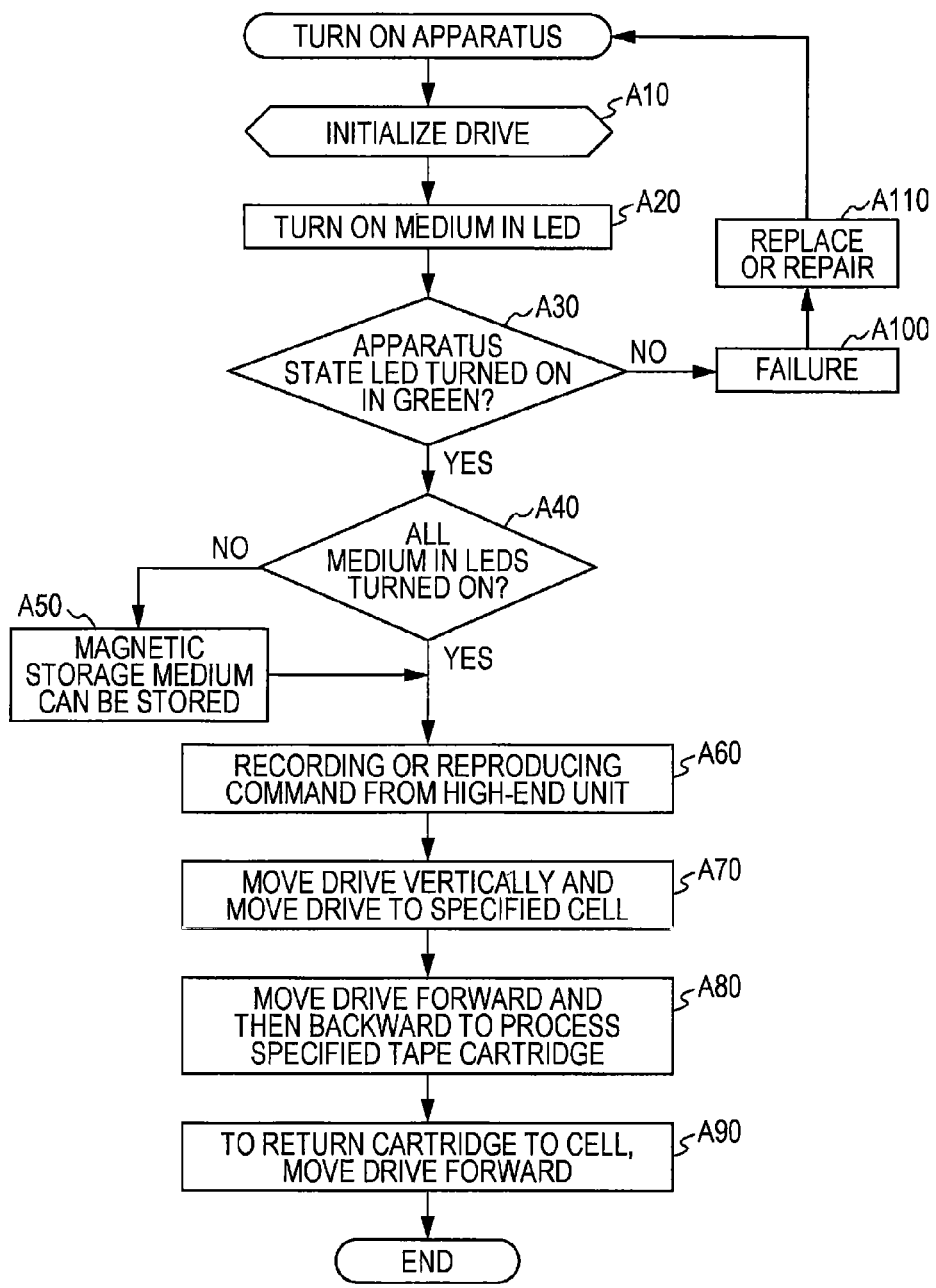
FIG. 22 is a flowchart illustrating overall processing in the library apparatus.

Entire processing in the library apparatus 1 structured as described above, which is an example of the embodiment, is described according to the flowchart (operations A10 to A110) illustrated in FIG. 22.

When the library apparatus 1 is turned on, the drive 20 is first initialized (operation A10). If no abnormality is detected in the drive 20 during self test executed at the initialization of the drive 20, the control unit 40 turns on the apparatus state LED 512 on the front door 51 in green. If an abnormality is detected in the drive 20 during self test, the control unit 40 turns on the apparatus state LED 512 in red, for example.

The control unit 40 turns on the medium IN LED 511 corresponding to the cell 11 in which the tape cartridge 100 has been stored (operation A20).

The operator decides whether the apparatus state LED 512 has been turned on in green, that is, whether an abnormality has been detected in the drive 20 after the initialization in operation A10 (operation A30). If it is decided that the apparatus state LED 512 is not turned on in green (the result in operation A30 is No), the drive 20 may be decided to have a failure (operation A100). If the apparatus state LED 512 is not turned on in green, the control unit 40 may notify the high-end unit (not illustrated) that the drive 20 has an abnormality.

To remove the abnormality of the drive 20, the operator replace or repair the drive 20 (operation A110) and returns to operation A10.

If the apparatus state LED 512 is turned on in green (the result in operation A30 is Yes), the operator checks the states of the medium IN LEDs 511 (operation A40). If all the medium IN LEDs 511 are turned on (the result in operation A40 is Yes), the library apparatus 1 becomes ready and waits for a command to record data into or reproduce data from the tape cartridge 100 to be received from the high-end unit.

If only some of the medium IN LEDs 511 are turned on (the result in operation A40 is No), it is decided that additional tape cartridges 100 may be stored in the medium storage unit 10 (operation A50). After that, if the control unit 40 detects that only some of the medium IN LEDs 511 are turned on, the control unit 40 may notify the high-end unit (not illustrated) that additional tape cartridges 100 may be stored in the medium storage unit 10.

The library apparatus 1 receives, from the high-end unit, an access command to, for example, record data into or reproduce data from the tape cartridge 100 (operation A60).

The transport unit 200 transports the drive 20 to the cell 11 in which the tape cartridge 100 corresponding to the access command received from the high-end unit.

Specifically, the vertical driving mechanism 30 moves the drive 20 vertically in the locker 50 to the position of the cell 11 in which the tape cartridge 100 to be processed has been stored (operation A70). The front-rear driving mechanism 60 then moves the drive 20 in the cell 11 toward the front side, inserts the tape cartridge 100 into the drive 20, and carries out data access processing for the tape cartridge 100 (operation A80).

When the data access processing is completed for the tape cartridge 100, the front-rear driving mechanism 60 moves the drive 20 into the cell 11 with the tape cartridge 100 placed in the medium insertion and removal opening 23 to return the tape cartridge 100 into the cell 11. The tape cartridge 100 is thus returned into the cell 11 (operation A90), terminating the processing.

Figure 23:
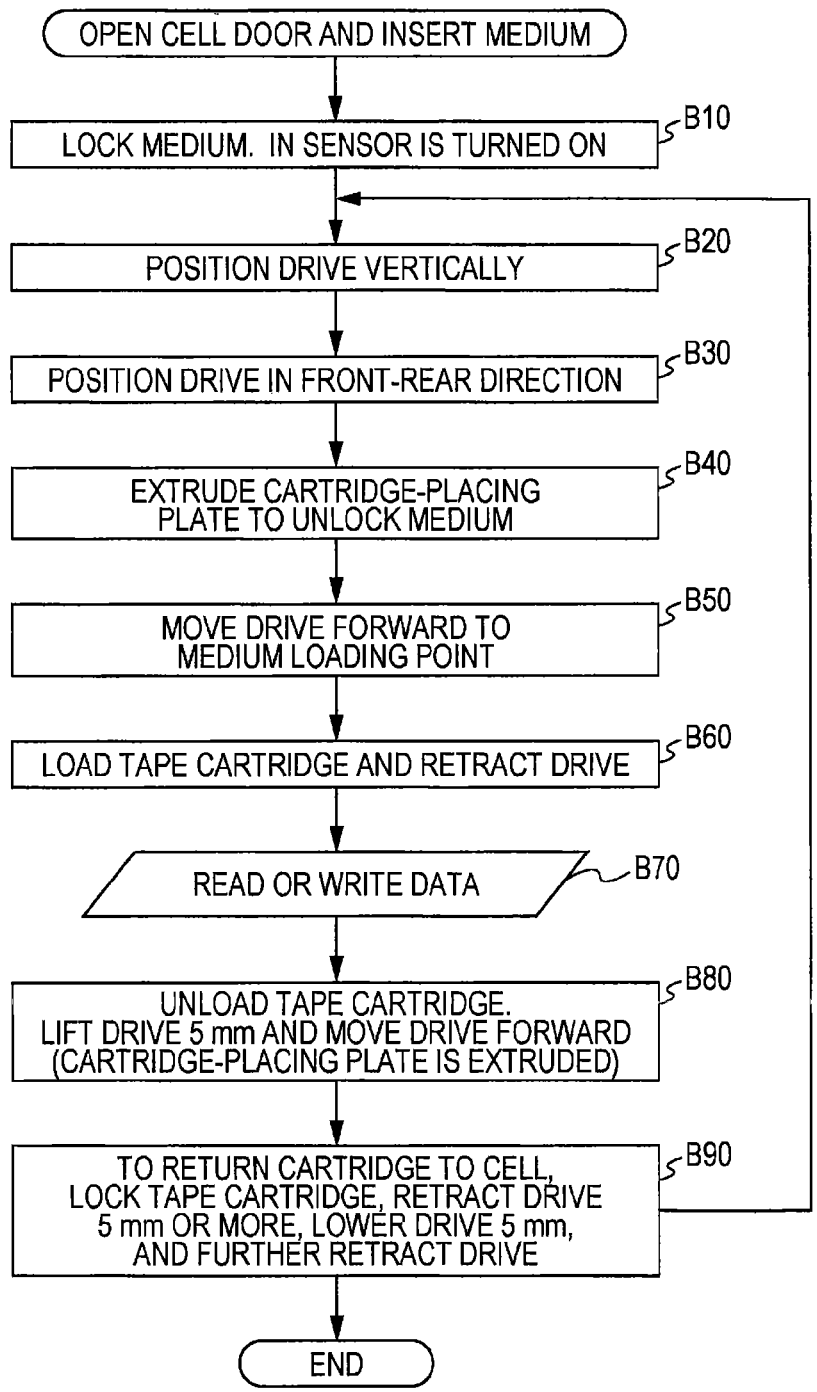
FIG. 23 is a flowchart illustrating a method in which the drive of the library apparatus accesses data in the tape cartridge.

Next, a method of accessing data in the tape cartridge 100 by the drive 20 of the library apparatus 1, which is an example of the embodiment, is described with reference to FIGS. 24 to 29, according to the flowchart (operations B10 to B90) illustrated in FIG. 23. FIGS. 24 to 29 each exemplify a positional relationship among the drive 20 and components of the medium storage unit 10 in the library apparatus 1, which is an example of the embodiment.

For simplicity, the locker 50 and some of components constituting the medium storage unit 10 and the like are not illustrated in the examples in FIGS. 24 to 29 as well.

Figure 24:
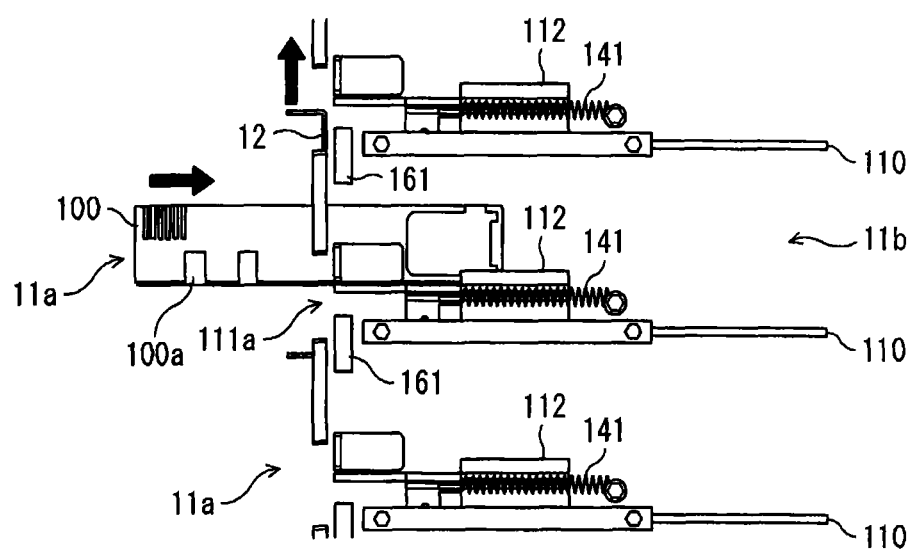
FIG. 24 is a side view representing a positional relationship among the drive and components of the medium storage unit in the library apparatus.

The operator first opens the front door 51 of the locker 50. The operator then opens the cell door 12 of the cell 11 as illustrated in FIG. 24 and inserts the tape cartridge 100 into the cell 11 through the operator-side opening 11a, starting processing.

Figure 25A:
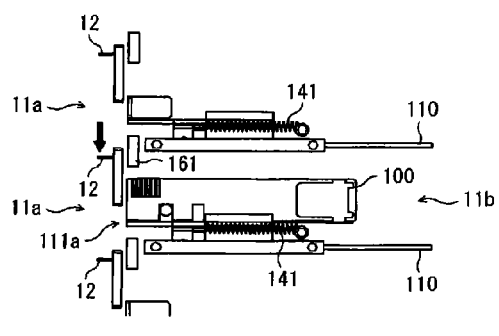
FIG. 25A is another side view representing a positional relationship among the drive and components of the medium storage unit in the library apparatus.
Figure 25B:
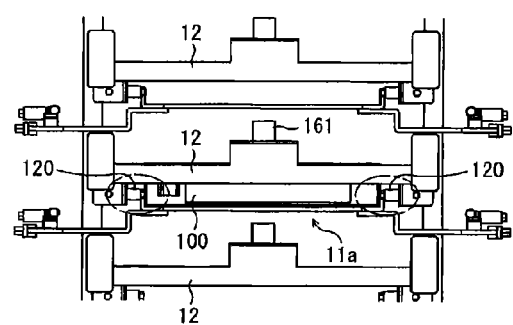
FIG. 25B is another front view representing a positional relationship among the drive and components of the medium storage unit in the library apparatus.

In operation B10, the operator lowers the cell door 12 by, for example, a manual operation as illustrated in FIG. 25A to close the operator-side opening 11a. In the cell 11, each medium locking pawl 120 engages the relevant concave part 100a in the tape cartridge 100 as illustrated in FIG. 25B, locking the tape cartridge 100. The IN sensor 161 senses the presence of the tape cartridge 100 in the cell 11 and notifies the control unit 40.

Figure 26:
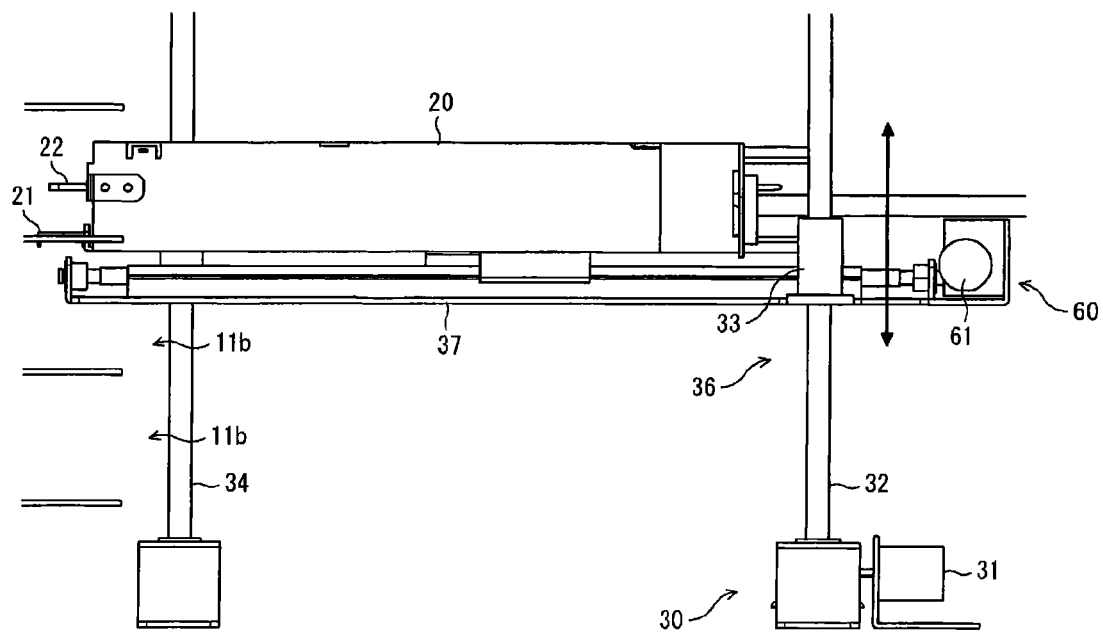
FIG. 26 is another side view representing a positional relationship among the drive and components of the medium storage unit in the library apparatus.

In operation B20, the vertical driving mechanism 30 of the transport unit 200 vertically positions the drive 20. Specifically, the vertical driving mechanism 30 vertically moves the drive 20 to the height of the drive-side opening 11b of the cell 11 in which the tape cartridge 100 to be accessed has been stored, as illustrated in FIG. 26. In the example in FIG. 27, the drive 20 has been vertically positioned to read data from the tape cartridge 100 stored in a third cell 11 from the bottom of the medium storage unit 10.

In operation B30, the front-rear driving mechanism 60 of the transport unit 200 positions the drive 20 in the front-rear direction. Specifically, the front-rear driving mechanism 60 moves the drive 20 toward the front side. During this movement, the tape cartridge 100 comes into contact with the cell door 12, suppressing its movement toward the front side.

Figure 28A:
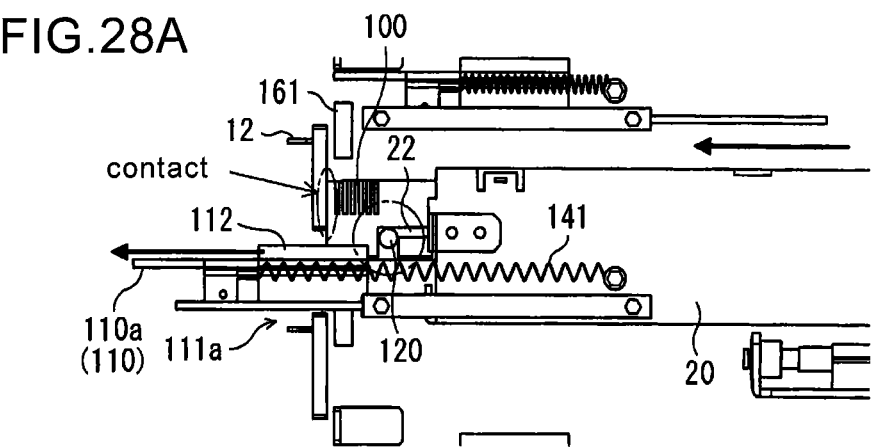
FIG. 28A is another side view representing a positional relationship among the drive and components of the medium storage unit in the library apparatus.

When the front-rear driving mechanism 60 further moves the drive 20 toward the front side, the tape cartridge 100 enters the medium insertion and removal opening 23 of the drive 20. Due to the movement of the drive 20 toward the front side, the pressing plate 21 of the drive 20 extrudes the cartridge-placing plate 110 to the front side. Accordingly, the cartridge-placing plate 110 extrudes from the storage space of the medium storage unit 10 through the opening 111a below the cell door 12, as illustrated in FIG. 28A. In this case, the coil springs 141 are pulled according to the movement of the cartridge-placing plate 110 toward the front side.

Figure 28B:
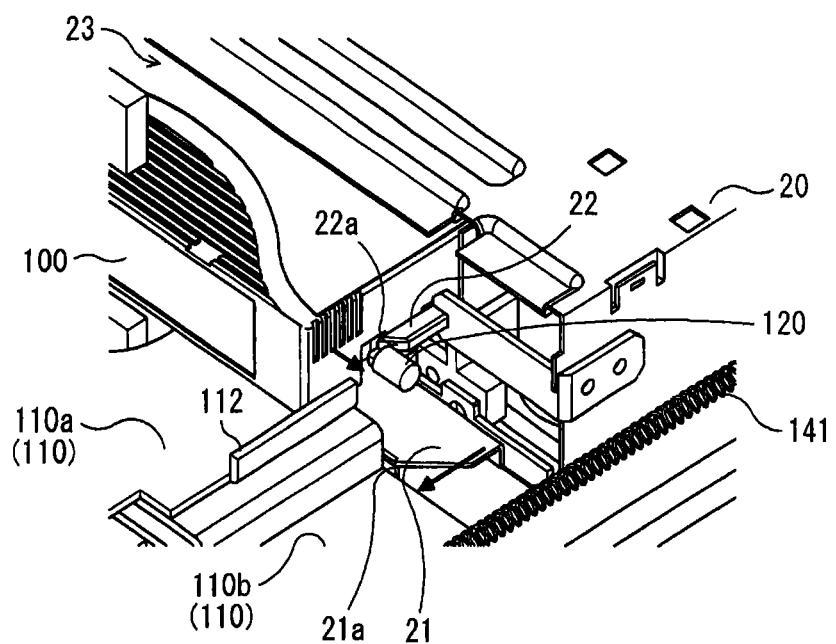
FIG. 28B is another perspective view representing a positional relationship among the drive and components of the medium storage unit in the library apparatus.

Each unlocking pawl 22 of the drive 20 enters the space between the tape cartridge 100 and the medium locking pawl 120 as illustrated in FIG. 28B and its slanted surface 22a extrudes the head 122 of the medium locking pawl 120, which is engaging the concave part 100a, from the concave part 100a, unlocking the tape cartridge 100 (operation B40).

The front-rear driving mechanism 60 then moves the drive 20 toward the front side to the medium loading point (operation B50).

Figure 29:
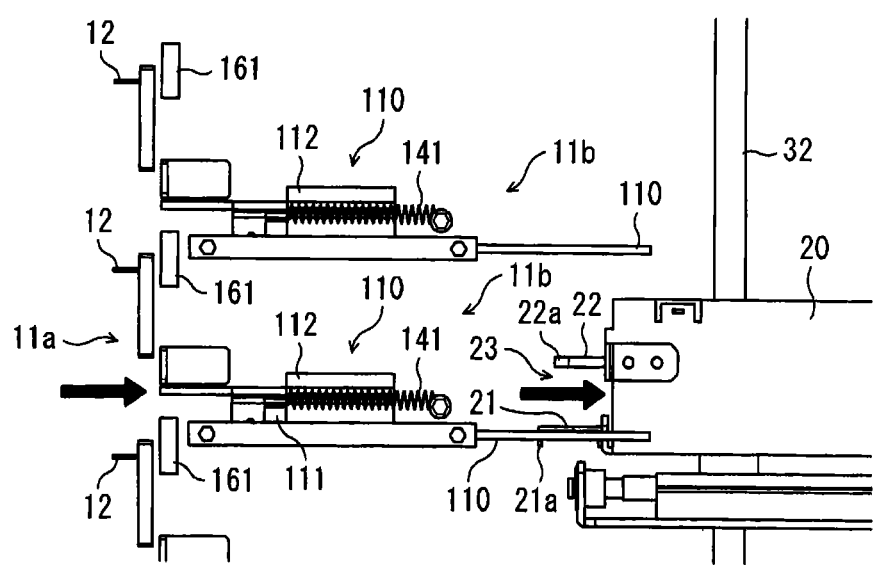
FIG. 29 is another side view representing a positional relationship among the drive and components of the medium storage unit in the library apparatus.

When the drive 20 reaches the medium loading point, the drive 20 starts to load the tape cartridge 100 and the tape cartridge 100 is transported to the loading position in the drive 20 in operation B60. In operation B60, the front-rear driving mechanism 60 also retracts the drive 20 to a prescribed position as illustrated in FIG. 29. Accordingly, the cartridge-placing plate 110, which has been protruded toward the front side by the pressing plate 21 of the drive 20, is pulled back into the cell 11 due to the contraction of the coil springs 141.

In operation B70, the magnetic head reads data from or writes data onto the magnetic tape in the tape cartridge 100 with the drive 20 positioned at the prescribed position.

Figure 30:
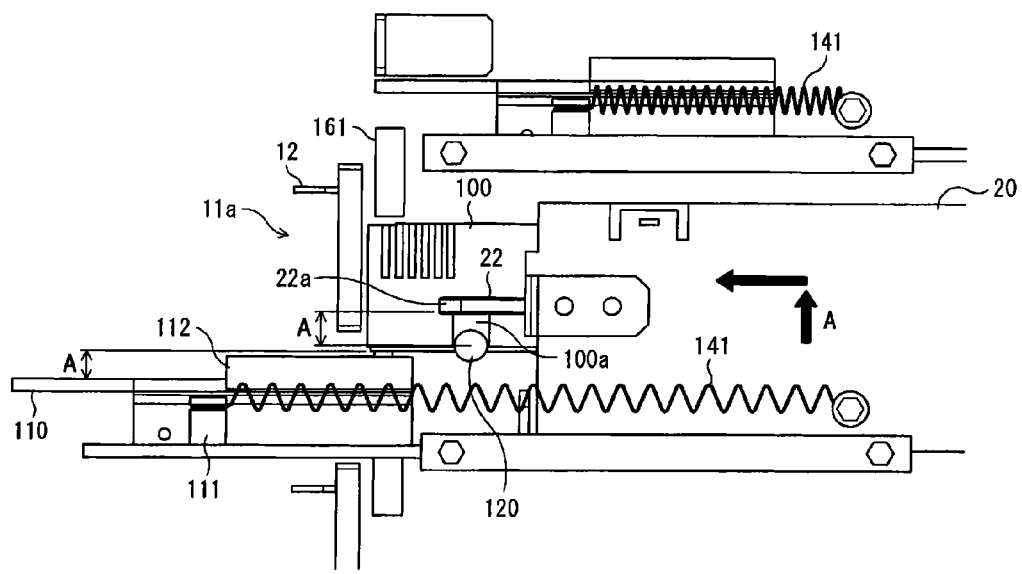
FIG. 30 is another side view representing a positional relationship among the drive and components of the medium storage unit in the library apparatus.

When the data has been read or written in the drive 20, the tape cartridge 100 is unloaded from the drive 20 and the tape cartridge 100 is ejected from the medium insertion and removal opening 23 of the drive 20 and protrudes in operation B80. The vertical driving mechanism 30 then lifts the drive 20 to a prescribed height A (A is, for example, about 5 mm) and the front-rear driving mechanism 60 moves the lifted drive 20 toward the front side, as illustrated in FIG. 30. The prescribed height to which to lift the drive 20 is preferably larger than the diameter of the cylindrical body 121 of the medium locking pawl 120.

During this movement, the pressing plate 21 of the drive 20 extrudes the cartridge-placing plate 110 toward the front side. Accordingly, the cartridge-placing plate 110 protrudes from the storage space of the medium storage unit 10 through the spacing below the cell door 12. Each coil spring 141 is stretched according to the movement of the cartridge-placing plate 110 toward the front side.

In operation B90, when the drive 20 moves toward the front side, the tape cartridge 100 reaches to a position at which each medium locking pawl 120 engages the relevant the concave part 100a, due to the movement of the drive 20 toward the front side. Since the front-rear driving mechanism 60 moves the drive 20 toward the front side while the drive 20 is being lifted to the prescribed height by the vertical driving mechanism 30, the unlocking pawl 22 of the drive 20 does not interfere with the medium locking pawl 120, enabling the tape cartridge 100 to be reliably locked.

Figure 31:
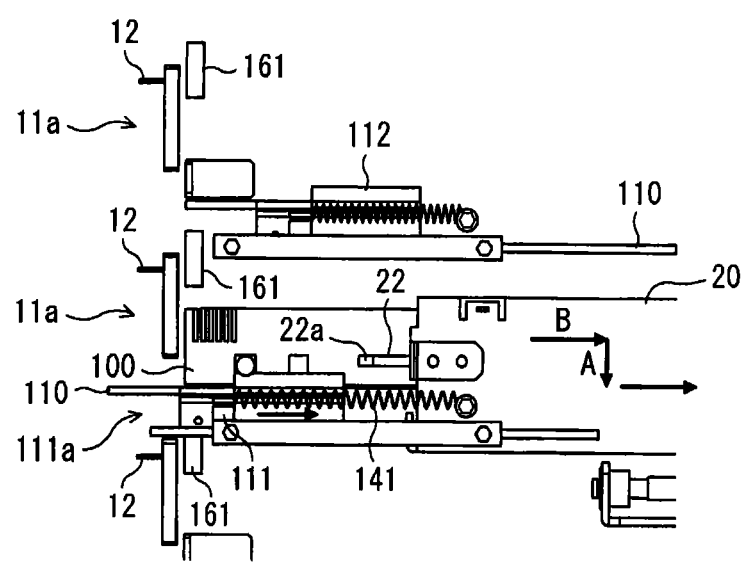
FIG. 31 is another side view representing a positional relationship among the drive and components of the medium storage unit in the library apparatus.

As illustrated in FIG. 31, the front-rear driving mechanism 60 moves the drive 20 by a prescribed distance B (B is, for example, about 5 mm) toward the rear side while the vertical driving mechanism 30 is lifting the drive 20 to the prescribed height A described above (A is, for example, about 5 mm).

The prescribed distance B is preferable larger than the diameter of the cylindrical body 121 of the medium locking pawl 120. This assures that the unlocking pawls 22 do not unlock the locked tape cartridge 100 stored in the cell 11.

Figure 32:
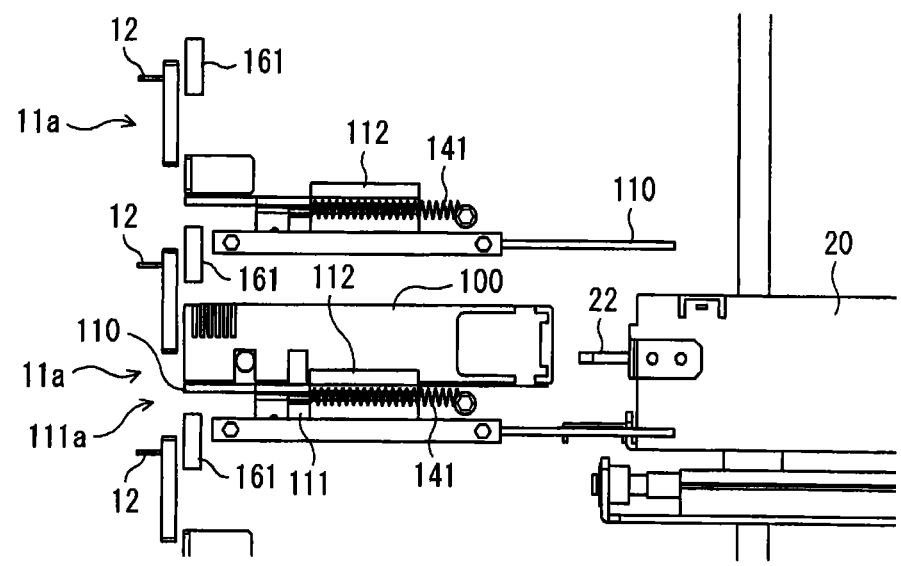
FIG. 32 is another side view representing a positional relationship among the drive and components of the medium storage unit in the library apparatus.

As illustrated in FIG. 32, the vertical driving mechanism 30 then lowers the drive 20 by an amount equal to the prescribed height A and the front-rear driving mechanism 60 retract the 20 to a prescribed standby position, terminating the processing. The standby position of the drive 20 is a position at which no interference occurs between, for example, the medium storage unit 10 and the locker 50 even if the vertical driving mechanism 30 moves the drive 20 vertically.

When data in another tape cartridge 100 is accessed, the drive 20 returns to operation B20 and access the tape cartridge 100 that is to be processed.

With the library apparatus 1, which is an example of the embodiment, the drive 20 may be used to read data from and write data into a plurality of tape cartridges 100 without using a mechanism that grasps the tape cartridge 100 and transports it. Accordingly, the library apparatus 1 may be made compact with a simplified structure and its manufacturing cost may be reduced.

Since the transport unit 200 may be implemented by two driving motors, vertical driving motor 31 and front-rear driving motor 61, the power consumption of the library apparatus 1 may be reduced.

The disclosed technology is not limited to the embodiment described above; many variations of the embodiment are possible without departing from the intended scope of the embodiment.

Although, in the example in the above embodiment, the coil springs 141 have been used as the mechanism to return the cartridge-placing plate 110 to the home position, for example, this is not a limitation; springs other than coil springs may be used. Alternatively, elastic members such as rubber other than springs may be used.

Although, in the embodiment described above, the IN sensor 161 has been used as the proximity sensor, this is not a limitation; a contact switch or another switch may be used and other many variations are possible.

This embodiment may be implemented and manufactured by those skilled in the art according to the disclosure described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A library apparatus, comprising:
   a medium storage unit that has a plurality of cells, the plurality of cells being storable a recording medium for each, each of the plurality of cells having a cell door that is configured to slide vertically;
   a recording and reproducing unit that starts to read data from and writes data onto the recording medium when the recording medium has been inserted; and
   a transport unit that transports the recording and reproducing unit to one of the plurality of cells in which the recording medium subject to data access is stored and inserts the recording medium into a medium insertion and removal opening of the recording and reproducing unit.

2. The library apparatus according to claim 1, wherein the transport unit transports the recording and reproducing unit to a medium loading point at which the recording and reproducing unit starts to carry out access processing for the recording medium.

3. The library apparatus according to claim 2, wherein:
   a placing part, on which the recording medium is slidably placed, is provided in the cell;
   the recording and reproducing unit has a pressing part that protrudes toward the cell; and
   when the transport unit transports the recording and reproducing unit toward the recording medium in the cell, the recording and reproducing unit enters the cell while the pressing part is pressing the placing part.

4. The library apparatus according to claim 1, wherein:
   the cell has a medium locking unit that locks the recording medium; and
   the recording and reproducing unit has an unlocking unit that unlocks the recording medium, which has been locked to the cell.

5. The library apparatus according to claim 1, wherein after the recording and reproducing unit completes the data access to the recording medium, the transport unit transports the recording and reproducing unit to one of the plurality of cells in which to store the recording medium and stores the recording medium in the cell.

6. The library apparatus according to claim 1, wherein the recording and reproducing unit comprises a tape drive and the recording medium comprises a cartridge.

7. A library apparatus, comprising:
   a medium storage that has a plurality of cells, each of the cells configured to store a cartridge, each of the plurality of cells having a cell door that is configured to slide vertically;
   a tape drive configured to read data from and write data onto the cartridge when the cartridge has been inserted into the tape drive; and
   a transporter that transports the tape drive to one of the plurality of cells in which the cartridge is stored and inserts the cartridge into a medium insertion and removal opening of the tape drive.

* * * * *

UNITED STATES PATENT AND TRADEMARK OFFICE
CERTIFICATE OF CORRECTION

PATENT NO. : 8,879,198 B2  
APPLICATION NO. : 13/540993  
DATED : November 4, 2014  
INVENTOR(S) : Tsukasa Minemura Page 1 of 1

It is certified that error appears in the above-identified patent and that said Letters Patent is hereby corrected as shown below:

On the title page

Column 2, Item [57] (Abstract), Line 3 Delete "recoding" and insert -- recording --, therefor.

Column 2, Item [57] (Abstract), Line 5 Delete "recoding" and insert -- recording --, therefor.

Column 2, Item [57] (Abstract), Line 6-7 Delete "recoding" and insert -- recording --, therefor.

Column 2, Item [57] (Abstract), Line 9 Delete "recoding" and insert -- recording --, therefor.

Signed and Sealed this  
Third Day of March, 2015

Michelle K. Lee  
*Deputy Director of the United States Patent and Trademark Office*